US007005607B2

(12) United States Patent
Takatani et al.

(10) Patent No.: US 7,005,607 B2
(45) Date of Patent: Feb. 28, 2006

(54) WELDING METHOD, WELDING DEVICE, WELDED JOINT, AND WELDED STRUCTURE

(75) Inventors: Toru Takatani, Tsuchiura (JP); Yutaka Takano, Inashiki-gun (JP); Naoki Miyanagi, Niihari-gun (JP); Hikaru Yamamoto, Ryugasaki (JP); Shigeyuki Sakurai, Tsukuba (JP); Manabu Hirakawa, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 157 days.

(21) Appl. No.: 10/468,228

(22) PCT Filed: Feb. 18, 2002

(86) PCT No.: PCT/JP02/01379

§ 371 (c)(1),
(2), (4) Date: Aug. 18, 2003

(87) PCT Pub. No.: WO02/066194

PCT Pub. Date: Aug. 29, 2002

(65) Prior Publication Data

US 2004/0074885 A1 Apr. 22, 2004

(30) Foreign Application Priority Data

Feb. 19, 2001 (JP) ............................. 2001-042141
Aug. 7, 2001 (JP) ............................. 2001-238953

(51) Int. Cl.
*B23K 9/12* (2006.01)
(52) U.S. Cl. ............................. 219/124.34; 219/137 R

(58) Field of Classification Search ............ 219/137 R, 219/125.1, 124.34, 124.22
See application file for complete search history.

(56) References Cited

U.S. PATENT DOCUMENTS 3,182,179 A * 5/1965 Anderson, Sr. ......... 219/137 R
3,882,654 A * 5/1975 Yancey ....................... 403/271

(Continued)

FOREIGN PATENT DOCUMENTS

GB 2045473 A * 10/1980

(Continued)

*Primary Examiner*—Clifford C. Shaw
(74) *Attorney, Agent, or Firm*—Crowell & Moring LLP

(57) ABSTRACT

A welding method is disclosed for butt welding a first base material 1 and a second base material 2 with each other. To also permit stable and efficient formation of a bead in the form of a fillet weld on a back side of a groove by conducting arc welding from the side of the groove without arranging a bead beforehand on the back side of the groove, the first member 1, on which a root face 1a and a single groove face 1b have been formed, is brought at its root face 1a into contact with a flat surface 2a of the second base material 2. A welding wire 6 is arranged facing on the groove formed by the contact between the first base material 1 and the second base material 2. The first base material 1 and the second material 2 are caused to fuse at an area of contact between them by an arc from the welding wire 6. A melt, which has been formed by the fusion at the area of contact and the like, is forced out to the back side of the groove to form a bead B4 in the form of a fillet weld on the back side of the groove.

20 Claims, 17 Drawing Sheets

U.S. PATENT DOCUMENTS

| | | | |
|---|---|---|---|
| 4,097,716 A | * | 6/1978 | Reichelt et al. .......... 219/137 R |
| 4,417,126 A | * | 11/1983 | Kasahara et al. ...... 219/124.22 |
| 4,525,619 A | * | 6/1985 | Ide et al. ................ 219/124.22 |
| 5,066,847 A | * | 11/1991 | Kishi et al. ............ 219/124.34 |

FOREIGN PATENT DOCUMENTS

| | | |
|---|---|---|
| JP | 48-342 | 1/1973 |
| JP | 54-125151 | 9/1979 |
| JP | 63-309375 | 12/1988 |

* cited by examiner

WELDING METHOD, WELDING DEVICE, WELDED JOINT, AND WELDED STRUCTURE

TECHNICAL FIELD

This invention relates to a welding method to be conducted by arranging a single groove face, a welding apparatus useful in the welding method, and a welded joint and welded structure available by the method.

BACKGROUND ART

In a variety of welded structures such as steel skeleton constructions of buildings, bridges, industrial equipment and construction machinery, "T" joints are adopted as welded joints in many instances. In general, a "T" joint is formed by bringing a single groove face of one of members into abutment against a surface of the other member to arrange these members in a "T" pattern and forming a bead in a groove, which has been formed at an area of contact between the surface of the above-mentioned other member and the above-mentioned one member, to join these members together. As known examples of this type, there are the welding methods disclosed in JP-A-08332567 and JP-A-06023544. The former conventional technique requires advance arrangement of a bead on the back side of a groove, which is formed at an area of contact between two members, to avoid burn-through of a groove root portion. The latter conventional technique, on the other hand, requires advance arrangement of a bead on the back of a groove, which is formed at an area of contact between two members, to prevent the weld metal from punching through or any part from remaining undeposited.

As a control method for making a center of a welding torch trace a weld line upon conducting automated welding, an arc sensor is widely employed to make use of electrical changes associated with changes in arc length and wire extension when the welding torch is caused to weave in the direction of the width of a groove. As conventional art of this sort primarily for an offset in the direction of the width of a groove, it is known, as disclosed in JP-B-53011502, to compare the magnitude of an integral of welding currents obtained at left ends of weaving with that of an integral of welding currents obtained at right ends of the weaving and then to correct the welding torch leftward or rightward on the basis of a signal representative of the comparison to trace a weld line.

To prevent the burn-through of a groove root portion at an area of contact between one of members, said one member having a single groove face, and the other member against which the single groove surface is brought into abutment, the above-mentioned conventional technique includes advance arrangement of a bead at the area of contact on a side opposite to the welded side. Depending on the shape of a welded joint structure or welded structure, however, it may be difficult, from the standpoint of actually performing welding, to arrange a bead beforehand on the back side of a groove as in the above-mentioned conventional technique.

When performing automated welding, an arc sensor is widely employed as in the above-mentioned conventional technique. Conventional arc sensing methods, however, have difficulty in tracing a weld line because they are not designed to be applicable to such a welding method that by arc welding from the side of a groove, a bead is formed on the back side.

It is also difficult to trace a weld line when a move or deformation occurs in a groove in the direction of the width of the groove or in the direction of a distance to a tip of a welding wire due to restraint conditions for a first base material and second base material or a thermal distortion or the like upon welding.

With the foregoing in view, work-related limitations are considered to be eliminated provided that a bead in the form of a fillet weld can be stably formed on the back side of a groove by arc welding from the side of the groove without arranging any bead beforehand on the back side of the groove.

The present invention has been completed in view of such background circumstances, and its objects are to provide a welding method for permitting stable and efficient formation of a bead in the form of a fillet weld on a back side of a groove by arc welding from the side of the groove without arranging a bead beforehand on the back side of the groove, a welding apparatus useful for the welding method, and a welded joint and welded structure fabricated by the welding method.

DISCLOSURE OF THE INVENTION

To achieve the above-described objects, the present invention is constituted as will be described in the following aspects.

Described specifically, a first aspect is characterized in that in a welding method for butt welding a first base material and a second base material with each other, the welding method comprises bringing the first base material, on an end portion of which a root face and a single groove face have been formed, into contact at the root face thereof with a flat surface of the second base material, arranging a welding wire to face on a groove formed by the contact between the first base material and the second base material, causing the first base material and the second material to fuse at an area of contact therebetween by an arc from the welding wire, and forcing a melt, which has been formed by the fusion, out to a back side of the groove to form a bead on the back side of the groove.

According to the first aspect, a difference in thermal capacity between the first base material provided with the single groove face and the second base material having the flat surface and fusion of the welding wire make it possible to achieve welding in the groove and also to stably deposit a bead in the form of a fillet weld on the back side of the first base material, said back side being on a side opposite to the side of the groove. Described specifically, the bead in the form of the fillet weld can also be formed by causing a greater portion of the arc to generate on the side of the second material the thermal capacity of which is greater, causing the first base material, the thermal capacity of which is smaller, to fuse to such an extent that the first base material is not punched through, and forcing out the melt of the welding wire to the back side of the first base material, said back side being on the side opposite to the side of the groove, while filling up the groove with the melt of the welding wire. As no work is needed for the arrangement of an auxiliary bead, a backing strip and the like, the workability during welding can be improved, and moreover, the manufacturing cost can be lowered.

A second aspect is characterized in that in a welding method for butt welding a first base material and a second base material with each other, the welding method comprises positioning a center axis of an arc from a welding wire at an aimed point, which is located either at a position of contact between a single groove face formed on the first base material and a flat surface of the second base material or at a position adjacent and not farther than the position of contact, obliquely irradiating the arc at a predetermined inclination onto the flat surface of the second base material in a direction passing through the aimed point such that the first base material and the second base material are caused to fuse at an area of contact therebetween, and forcing a melt, which has been formed by the fusion, out to a back side of the groove to form a bead on the back side of the groove.

According to the second aspect, the bead can be stably formed because the stability in the feeding of a voltage and current to the area of contact can be enhanced.

A third aspect is characterized in that in the second aspect, the welding wire is caused to weave with a predetermined oscillation width within the groove while maintaining the predetermined inclination.

A fourth aspect is characterized in that in the second aspect, the welding wire is caused to weave with a predetermined oscillation width with a center of weaving set at a predetermined point on the predetermined inclination within the groove.

According to the third or fourth aspect, stable welding is feasible by the weaving operation of the welding wire.

A fifth aspect is characterized in that in the third or fourth aspect, while the welding wire is weaving, a change in welding voltage or welding current during a time after the arc moves past the predetermined position until the arc moves toward the first base material and returns back to the position of contact is detected based on a time at which the arc passes through the position of contact, and the welding wire is moved in a direction of a width of the groove on a basis of the thus-detected change such that the center of the weaving always remains at an appropriate position relative to the groove.

According to the fifth aspect, even if a move or deformation takes place in the groove in the direction of the width of the groove due to restraint conditions for the first base material and the second base material and/or a thermal distortion during welding, the welding can be appropriately corrected to trace a weld line in the groove by moving the welding wire. This makes it possible to more accurately force out the melt to the back side of the groove and hence, to also form a bead in the form of a fillet weld.

A sixth aspect is characterized in that in the third or fourth aspect, while the welding wire is weaving, a change in welding voltage or welding current during a time after the arc moves past the predetermined position until the arc moves toward the first base material and returns back to the position of contact is detected based on a time at which the arc passes through the position of contact, and a tip of the welding wire is moved toward or away from the position of contact on a basis of the thus-detected change such that the center of weaving always remains at an appropriate position relative to the groove.

According to the sixth aspect, even if a relative movement takes place between the groove and a tip of the welding wire due to restraint conditions for the first base material and the second base material and/or a thermal distortion or the like during welding and their positional relation is changed from their preset positional relation, the welding can be appropriately corrected to trace a weld line in the groove by moving the tip of the welding wire toward or away from the groove. This makes it possible to more accurately force out the melt to the back side of the groove and hence, to also form a bead in the form of a good fillet weld.

A seventh aspect is characterized in that in the first or second aspect, the bead formed on the back side of the groove is a weld bead in a form of a fillet weld.

According to the seventh aspect, a bead in the form of a fillet weld can be stably formed.

An eighth aspect is characterized in that in the first or second aspect, a current for generating the arc is a direct current.

A ninth aspect is characterized in that in the first or second aspect, a current for generating the arc is a current obtained by superimposing a direct current and a pulse current on each other.

A tenth aspect is characterized in that in the first or second aspect, a current for generating the arc is a sinusoidal current.

According to the ninth or tenth aspect, the directivity of the arc is improved and, even if a slight offset occurs between the welding wire and the aimed point for a certain reason, the arc is not disturbed too much and the amount of a melt to be forced out to the side opposite to the groove is stabilized. It is, therefore, possible to form a bead in the form of a fillet weld and to perform stable welding.

An eleventh aspect is characterized in that in a welded "T" joint with a first base material and a second base material butt welded with each other, the first base material and the second base material have been joined together at an area of contact between a flat surface of the second base material and the first base material, on which a root face positioned in contact with the flat surface and a single groove face are formed, by causing the first base material and the second base material to fuse at the area of contact with an arc from a welding wire positioned facing on a groove formed by the single groove face and the flat surface and forcing a melt, which was formed by the fusion, out to a back side of the groove to form a bead in a form of a fillet weld.

A twelfth aspect is characterized in that in a butt-welded "T" joint of flat plates with a first base material and a second base material butt welded with each other, the first base material and the second base material have been joined together at an area of contact between an end surface of the second base material and the first base material, on which a root face positioned in contact with the end surface and a single groove face are formed, by causing the first base material and the second base material to fuse at the area of contact with an arc from a welding wire positioned facing on the groove and forcing a melt, which was formed by the fusion, out to a back side opposite to a side of the groove to form a bead in a form of a fillet weld.

A thirteenth aspect is characterized in that in a box-shaped, welded structure formed by butt welding a plurality of base materials made of plates, each two base materials butt welded with each other have been joined together at an area of contact between a flat surface of one of the two base materials and the other base material, on which a root face positioned in contact with the flat surface and a single groove face are formed, by causing the base materials to fuse at the area of contact with an arc from a welding wire positioned facing on a groove formed by the single groove face and the flat surface and forcing a melt, which was formed by the fusion, out to a back side of the one base material, said back side being on a side opposite to a side of the groove, to form a bead in a form of a fillet weld.

According to the eleventh to thirteenth aspects, it is possible to provide a welded joint or box-shaped structure which is low in manufacturing cost and permits a reduction in manufacturing time.

A fourteenth aspect is characterized in that in a welding apparatus for butt welding a first base material and a second base material with each other, the welding apparatus comprises a welding wire to be introduced into a groove formed at an area of contact between the first base material and the second material, a control device for controlling a position of the welding wire, a welding power source for feeding welding electric power to the area of contact, and control means for outputting a command to the control device such that the welding wire is moved toward the second base material when an actual voltage fed from the welding power source to the area of contact has exceeded a first preset voltage level set in advance and the welding wire is moved toward the first base material when an actual current fed from the welding power source to the area of contact has exceeded a preset current level set in advance or the actual voltage has fallen below a second preset voltage level set in advance.

According to the fourteenth aspect, while performing arc welding of the first base material and the second base material from one side, the center axis of an arc can be accurately position-controlled at a predetermined inclination relative to the second base material so that a bead in the form of a fillet weld can be stably formed on the back side of the groove side.

A fifteenth aspect is characterized in that in a welding apparatus for butt welding a first base material and a second base material with each other, the welding apparatus comprises a welding wire to be introduced into a groove formed at an area of contact between the first base material and the second material, a control device for controlling a position of the welding wire, a welding power source for feeding welding electric power to the area of contact, and control means for outputting a command to the control device such that the welding wire is moved toward the second base material when an actual voltage fed from the welding power source to the area of contact has exceeded a first preset voltage level set in advance and the welding wire is moved toward the first base material when an actual current fed from the welding power source to the area of contact has exceeded a preset current level set in advance or the actual voltage has fallen below a second preset voltage level set in advance and also for comparing the actual current and voltage with a preset average current level and preset average voltage level set in advance, respectively, and outputting a current control signal and voltage control signal to the welding power source such that these actual current and voltage become equal to the preset current and voltage levels set in advance.

A sixteenth aspect is characterized in that in a welding apparatus for butt welding a first base material and a second base material with each other, the welding apparatus comprises a welding wire, a welding torch for holding the welding wire in place, feeding means for feeding the welding wire to the welding torch, a control unit provided with a position control device for positionally controlling the welding wire in directions of three orthogonal axes, a welding power source for feeding welding electric power to an area of contact between the first base material and the second base material, an average voltage setting device for setting an average voltage level for the welding, an average current setting device for setting an average current level for the welding, a voltage detector and current detector for detecting an actual welding voltage and actual welding current to form, by the welding wire positioned facing on a groove formed by a single groove face arranged on the first base material and a flat surface of the second base material, a bead in a form of a fillet weld on a back side of the groove, a power diagnosis unit for being inputted with the actual voltage detected by the voltage detector and the actual current detected by the current detector, outputting a command to the position control device such that the welding wire is moved toward the second base material when the actual voltage has exceeded a first preset voltage level set in advance and the welding wire is moved toward the first base material when the actual current detected by the current detector has exceeded a preset current level set in advance or the actual voltage detected by the voltage detector has fallen below a second preset voltage level set in advance, and also outputting the actual voltage and outputting the actual current, the current control device for comparing the average current level inputted from the average current setting device with the actual current inputted from the power diagnosis unit and outputting a current control signal such that this actual current becomes equal to the preset current level set in advance, a voltage control device for comparing the average voltage level inputted from the average voltage setting device with the actual voltage inputted from the power diagnosis unit and outputting a voltage control signal such that this actual voltage becomes equal to the preset voltage level set in advance, and the output control device for being inputted with the current control signal outputted from the current control device and the voltage control signal outputted from the voltage control device, and based on these current control signal and voltage control signal, outputting a power source control signal to the welding power source to control an output of the power source.

According to the fifteenth or sixteenth aspect, while performing arc welding of the first base material and the second base material from one side, the center axis of an arc is accurately position-controlled at a predetermined inclination relative to the second base material, and an average voltage and average current are also controlled to become equal to their corresponding preset values. It is, therefore, possible to stably form a bead in the form of a fillet weld on the back side of the groove.

A seventeenth aspect is characterized in that in the sixteenth aspect, the welding apparatus is provided with a peak voltage setting device for setting a peak voltage for a pulse voltage, a base voltage setting device for setting abase voltage, a pulse duration setting device for setting a pulse duration, and a pulse waveform control device for being inputted with the preset peak voltage, preset base voltage level and preset pulse duration from the peak voltage setting device, base voltage setting device and pulse duration setting device, respectively, comparing these preset values with an actual peak voltage, actual base voltage and actual pulse duration, respectively, and outputting a waveform control signal to the output control device, the power diagnosis unit comprises means for determining an actual peak voltage, actual base voltage and actual pulse duration on a basis of the actual voltage detected by the voltage detector and the actual current detected by the current detector, and outputting the thus-determined actual peak voltage, actual base voltage and actual pulse duration to the pulse waveform control device, and the output control device comprises means for being inputted with the waveform control signal outputted from the pulse waveform control device and outputting a power source control signal, which controls an output of the power source, to the welding power source on a basis of the voltage control signal inputted from the voltage control device and the current control signal inputted from the current control device.

An eighteenth aspect is characterized in that in the sixteenth aspect, the pulse waveform control device comprises sinusoidal current forming means for converting a welding current into a sinusoidal current, comparing a preset sinusoidal waveform, which has been set in advance, with an actual sinusoidal waveform and outputting a waveform control signal to the output control device, the power diagnosis unit comprises means for determining an actual current waveform on a basis of the actual voltage detected by the voltage detector and the actual current detected by the current detector, and outputting the thus-determined actual current waveform to the sinusoidal current forming means, and the output control device comprises means for outputting a power source control signal, which controls an output of the power source, to the welding power source on a basis of the waveform control signal inputted from the sinusoidal current forming means, the voltage control signal inputted from the voltage control device and the current control signal inputted from the current control device.

According to the seventeenth or eighteenth aspect, a pulse current is used as an arc welding current so that an arc is provided with higher directivity and can more precisely impinge on a position aimed by the arc. Further, the arc can be accurately maintained at a predetermined inclination. This makes it possible to prevent occurrence of an inconvenience such as a burn-through at the area of contact between the first base material and the second base material or remaining of undeposited parts, and accordingly, to deposit a fillet-weld-shaped bead in a stable form on the back side of the groove.

A nineteenth aspect is characterized in that in a welding apparatus for butt welding a first base material and a second base material with each other, the welding apparatus comprises a welding wire to be introduced through a welding torch into a groove formed by bringing the first base material, on which a root face and a single groove face have been formed, into contact with the second material having a flat surface, a control device for controlling a position of the welding wire, a welding power source for feeding welding electric power to the area of contact, a voltage detector for detecting an actual voltage to be fed from the welding power source to the area of contact, a clock device for detecting a time, at which an arc from the welding wire passes through a position of contact between an end portion of the single groove face and the flat surface, and clocking a time after the arc passes through the position of contact until the arc moves toward the first base material and returns back to the predetermined position, memory means for storing a change in welding voltage during the clocking time by the voltage detector and the clock device, and wire position control means for continuing preceding weaving control when a time $(t_4-t_3)-t_3$ being a time at which an actual voltage begins to exceed a preset voltage level set in advance and $t_4$ being a time at which the actual voltage falls below the preset voltage level, both while clocking a second predetermined time $Ät_2$ subsequent to an elapse of a first predetermined time $Ät_1$ from a time point at which the welding wire passed through the position of contact during the clocking time—falls within a target time range in which adequate fusion takes place without punching through the first base material, moving a center axis of weaving of the welding wire toward the second base material when the time $(t_4-t_3)$ exceeds the target time, and moving the center axis of weaving toward the first base material when the time $(t_4-t_3)$ falls below the target time.

A twentieth aspect is characterized in that in a welding apparatus for butt welding a first base material and a second base material with each other, the welding apparatus comprises a welding wire to be introduced through a welding torch into a groove formed by bringing the first base material, on which a root face and a single groove face have been formed, into contact with the second material having a flat surface, a control device for controlling a position of the welding wire, a welding power source for feeding welding electric power to the area of contact, a current detector for detecting an actual current to be fed from the welding power source to the area of contact, a clock device for detecting a time, at which an arc from the welding wire passes through a position of contact between an end portion of the single groove face and the flat surface, and clocking a time after the arc passes through the position of contact until the arc moves toward the first base material and returns back to the predetermined position, memory means for storing a change in welding current during the clocking time by the current detector and the clock device, and wire position control means for continuing preceding weaving control when a time $(t_4-t_3)-t_3$ being a time at which an actual current begins to fall below a preset current level set in advance and $t_4$ being a time at which the actual current exceeds the preset voltage level, both while clocking a second predetermined time $Ät_2$ subsequent to an elapse of a first predetermined time $Ät_1$ from a time point at which the welding wire passed through the position of contact during the clocking time—falls within a target time range in which adequate fusion takes place without punching through the first base material, moving a center axis of weaving of the welding wire toward the second base material when the time $(t_4-t_3)$ exceeds the target time, and moving the center axis of weaving toward the first base material when the time $(t_4-t_3)$ falls below the target time.

According to the nineteenth or twentieth aspect, even if a movement or distortion takes place in the groove in the direction of the width of the groove due to restraint conditions for the first base material and the second base material and/or a thermal distortion or the like during welding, the welding can be appropriately corrected to trace a weld line in the groove by moving the welding wire on the basis of the actual voltage or actual current detected by the actual voltage detector or actual current detector. This makes it possible to more accurately force out the melt to the back side of the groove and hence, to also form a bead in the form of a good fillet weld. As no work is needed for the arrangement of an auxiliary bead, a backing strip or the like and the welding can be performed by automatically and more accurately tracing the weld line, the workability of the welding can be improved.

A twenty-first aspect is characterized in that in a welding apparatus for butt welding a first base material and a second base material with each other, the welding apparatus comprises a welding wire to be introduced through a welding torch into a groove formed by bringing the first base material, on which a root face and a single groove face have been formed, into contact with the second material having a flat surface, a control device for controlling a position of the welding wire, a welding power source for feeding welding electric power to the area of contact, a voltage detector for detecting an actual voltage to be fed from the welding power source to the area of contact, a clock device for detecting a time, at which an arc from the welding wire passes through a position of contact between an end portion of the single groove face and the flat surface, and clocking a time after the arc passes through the position of contact until the arc moves toward the first base material and returns back to the predetermined position, memory means for storing a change in welding voltage during the clocking time by the voltage detector and the clock device, and wire tip position control means for moving a tip of the welding wire away from the position of contact when an actual average voltage during the clocking time falls below a preset first voltage level, moving the tip of the welding wire toward the position of contact when the actual average voltage exceeds a preset second voltage level, and maintaining the tip of the welding wire at a preceding position when the actual average voltage falls between the preset first voltage level and the preset second voltage level.

A twenty-second aspect is characterized in that in a welding apparatus for butt welding a first base material and a second base material with each other, the welding apparatus comprises a welding wire to be introduced through a welding torch into a groove formed by bringing the first base material, on which a root face and a single groove face have been formed, into contact with the second material having a flat surface, a control device for controlling a position of the welding wire, a welding power source for feeding welding electric power to the area of contact, a current detector for detecting an actual current to be fed from the welding power source to the area of contact, a clock device for detecting a time, at which an arc from the welding wire passes through a position of contact between an end portion of the single groove face and the flat surface, and clocking a time after the arc passes through the position of contact until the arc moves toward the first base material and returns back to the predetermined position, memory means for storing a change in welding current during the clocking time by the current detector and the clock device, and wire tip position control means for moving a tip of the welding wire away from the position of contact when an actual average current during the clocking time exceeds a preset first current level, moving the tip of the welding wire toward the position of contact when the actual average current falls below a preset second current level, and maintaining the tip of the welding wire at a preceding position when the actual average current falls between the preset first current level and the preset second current level.

According to the twenty-first or twenty-second aspect, even if a movement or distortion takes place in the groove in the direction of the width of the groove due to restraint conditions for the first base material and the second base material and/or a thermal distortion or the like during welding, the welding can be appropriately corrected to trace a weld line in the groove by moving the position of the tip of the welding wire closer or away on the basis of the actual average voltage or actual average current detected by the actual voltage detector or actual current detector. This makes it possible to more accurately force out the melt to the back side of the groove and hence, to also form a bead in the form of a good fillet weld. As no work is needed for the arrangement of an auxiliary bead, a backing strip or the like and the welding can be performed by automatically and more accurately tracing the weld line, the workability of the welding can be improved.

BEST MODES FOR CARRYING OUT THE INVENTION

A description will hereinafter be made about embodiments of the present invention.

1. First Embodiment

FIG. 1 through FIG. 9 are drawings for illustrating a welding method according to a first embodiment of the present invention.

Figure 1:
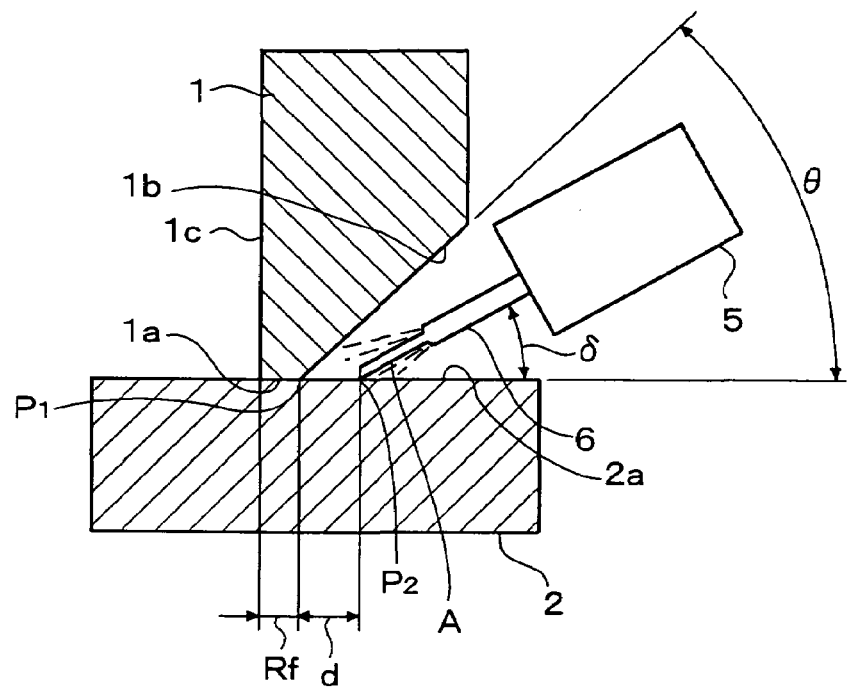
FIG. 1 is a schematic view illustrating welding work for a "T" joint by a first embodiment of the present invention.
Figure 2:
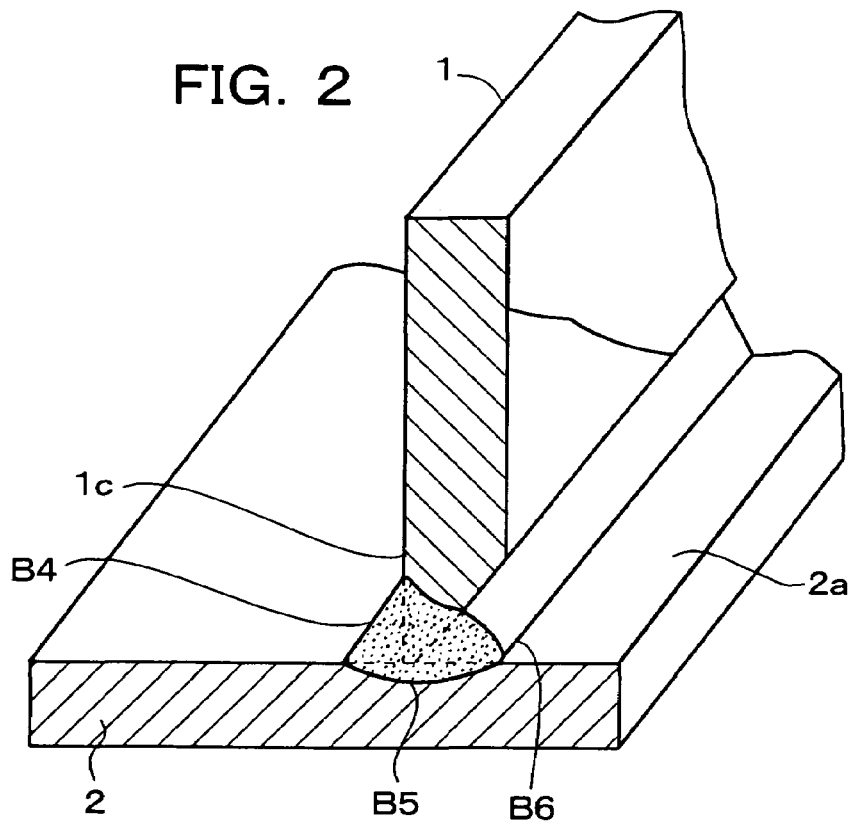
FIG. 2 is a perspective view showing the "T" joint welded by the welding work illustrated in FIG. 1.

FIG. 1 is a schematic view illustrating welding work for a "T" joint by the first embodiment of the welding method of the present invention, and FIG. 2 is a perspective view showing the "T" joint welded by the welding work illustrated in FIG. 1.

FIG. 1 illustrates a state upon welding a first base material 1 and a second base material 2 with each other by bringing them into abutment in the form of "T". The first base material 1 is provided at a butted end portion thereof with a root face 1a and a single groove face 1b which serves to form a single bevel groove. The second base material 2 has a flat surface 2a positioned in contact with the root face 1a of the first base material 1, and in combination with the first base material 1, forms a "T" joint. Numeral 5 designates a welding torch, and numeral 6 indicates a welding wire held in place by the welding torch 5 and fed by unillustrated feeding means. In FIG. 1, there are also indicated a dimension Rf in the direction of the thickness of the root face 1a, a position $P_1$ of contact between an end portion of the single groove face 1b of the first base material 1 and the flat surface 2a of the second base material 2, a point $P_2$ aimed by the center axis of an arc, and a distance d from the contact position $P_1$ to the aimed point $P_2$ by the center axis of the arc. Also shown are a groove angle è, a predetermined inclination ä between the center axis of the arc (welding wire) and the flat surface 2a of the second base material 2, and the center axis A of the arc.

With reference to the drawings, a description will hereinafter be made based on specific examples.

1.2 First Example

In this example, the first and second base materials 1, 2 were made of steel, and the dimension Rf of the root face 1a was 1 mm. By setting the root gap at 0 mm (in other words, the root face was in a contacted position) and the groove angle è at 45 degrees, $CO_2$ arc welding was conducted with the welding apparatus. As welding conditions, the average welding current was set at 310 A, the average welding voltage at 33 V, and the moving speed at 35 to 40 cm/min.

Under the above conditions, it was possible to stably deposit a bead in the form of a fillet weld of 2 to 8 mm at an area of abutment between a side 1c of the first base material 1, said side being located on a side opposite to the groove, and the flat surface 2a of the second base material 2 when the aimed point $P_2$ by the welding wire 6 (the center axis of the arc) was set 0 to 3 mm apart from the contact position $P_1$, the second base material 2 was placed in a substantially horizontal position, and the predetermined inclination ä formed between the flat surface 2a and the welding wire 6 was set at 15 to 35 degrees.

The results of the welding are shown in FIG. 2. FIG. 2 illustrates a bead B4 deposited in the form of a fillet weld between the side 1c of the base material 1, said side being located on a side opposite to the groove, and the flat surface 2a of the second base material 2, a bead B5 resolidified while causing the flat surface 2a of the second base material 2 to fuse, and a bead B6 formed on the side of the groove with addition of a melt from fusion of the welding wire 6 itself subsequent to the formation of the bead B4.

It is to be noted that the above-described specific values should be determined by taking into consideration various conditions such as the plate thicknesses of the first and second base materials 1,2 and the shape of the area of abutment between the first base material 1 and the second base material 2.

Figure 3:
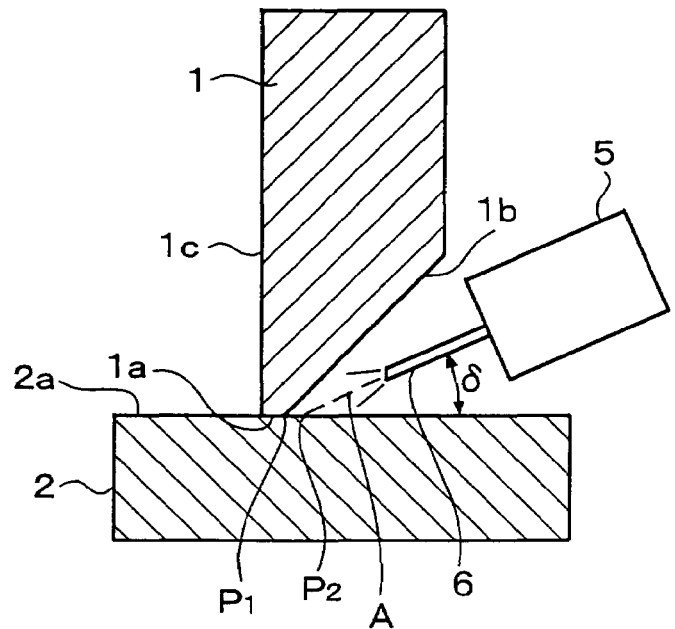
FIG. 3 is a schematic view showing a state in which the position of a welding wire has been set before initiation of welding in the welding work illustrated in FIG. 1.
Figure 4:
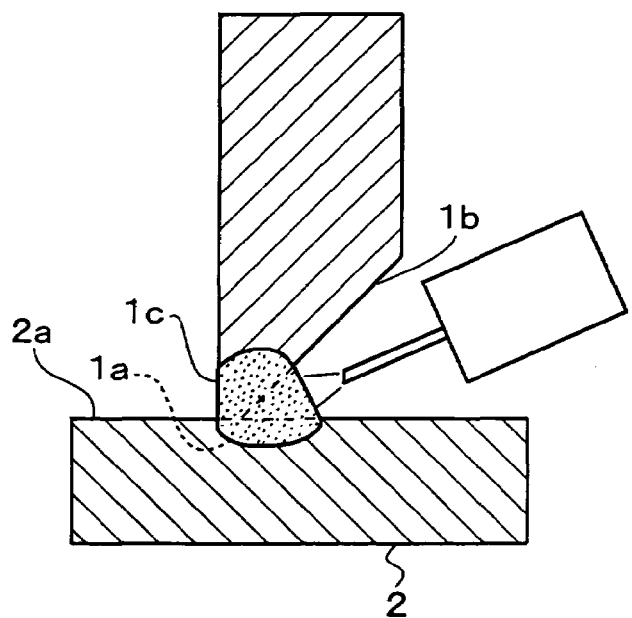
FIG. 4 is a schematic view depicting a state in which the welding has been initiated in the state shown in FIG. 3.
Figure 5:
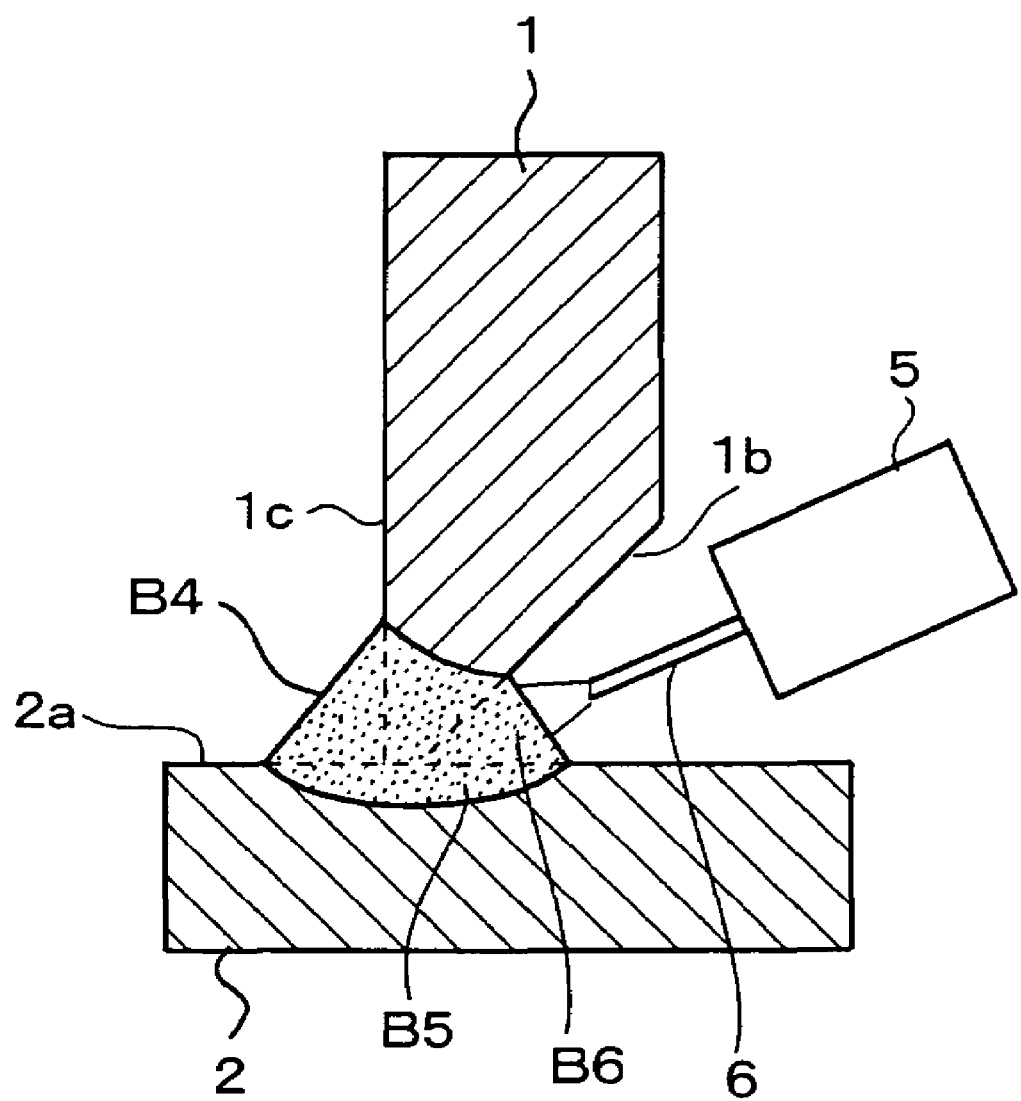
FIG. 5 is a schematic view showing a state in which the welding has proceeded further from the state depicted in FIG. 4.

The process of formation of the beads on the "T" joint in this example is shown in FIG. 3 to FIG. 5.

FIG. 3 is a schematic view showing a state in which the position of the welding wire has been set before initiation of welding in the welding work illustrated in FIG. 1. As illustrated in FIG. 3, the welding wire 6 is positioned opposite the groove by setting the aimed point $P_2$ of the welding wire 6 at a point a little apart toward the welding direction from the position $P_1$ of contact between the end portion of the groove face 1b and the flat surface 2a and tilting the direction of the welding wire at the predetermined inclination ä relative to the flat surface 2a of the second base material 2 the thermal capacity of which is greater.

FIG. 4 is a schematic view depicting a state in which welding has been initiated in the above-mentioned state shown in FIG. 3. Because the welding wire 6 is directed toward the flat surface 2a as depicted in FIG. 4, more heat is inputted in the flat surface 2a than in the single groove face 1b the thermal capacity of which is smaller. While both base materials 1,2 are being caused to fuse in a well-balanced manner, a molten pool is hence formed with addition of a melt from fusion of the welding wire 6 itself. As a result, on the side of the first base material 1 having the single groove face 1b of smaller thermal capacity, a fusion zone reaches the back side 1c which is located on the back side of the groove.

FIG. 5 is a schematic view showing a state in which the welding has proceeded further from the state depicted in FIG. 4. As shown in FIG. 5, the molten pool is forced out to the side opposite to the welding side, i.e., to the back side of the first base material 1 by the force of the arc, convection in the molten pool, and the like, and under the action of surface tension and the like, a molten pool is formed extending integrally from the inside of the groove to the back side of the base material 1. The melt then resolifies so that beads B4, B5 and B6 such as those shown in FIG. 2, namely, a first layer of the "T" joint is formed.

The above-described welded state corresponds to the welding of a first layer in the groove. Depending on the size of the groove, the welding of the remaining portion in the groove can be conducted in a similar manner as in the conventional art, and therefore, its description is omitted.

1.2 Second Example

As a second example, the following example can be given.

Under conditions that $CO_2$ arc welding was chosen as a welding process, the root face Rf was set at 1 mm, the root gap was set at 0 mm, the groove angle è was set at 45 degrees, the average current was set at 310 A, the average voltage was set at 33 V, the welding speed was set at 35 cm/min, the aimed point $P_2$ of the welding wire 6 was set at a point 2 mm apart from the contact position $P_1$ (d=2 mm), and the inclination a was set at 25 degrees, a "T" joint was welded from the side of the groove. When welded as described above, a bead B4 in the form of a fillet weld, which had a leg length of 7 mm in the vertical direction (on the side of the first base material 1) and a leg length of 5 mm in the horizontal direction (on the side of the second base material 2), was successfully deposited between the back side 1c of the first base material 1, said back side being located on the back side of the groove, and the flat surface 2a of the second base material 2 without leaving any undeposited part in the groove. It was also possible to obtain a bead B4 in the form of a fillet weld in a relatively stable manner by setting the aimed point $P_2$ of the welding wire 6 at a position 2 to 3 mm apart from the contact position $P_1$.

1.3 Third Example

Figure 6:
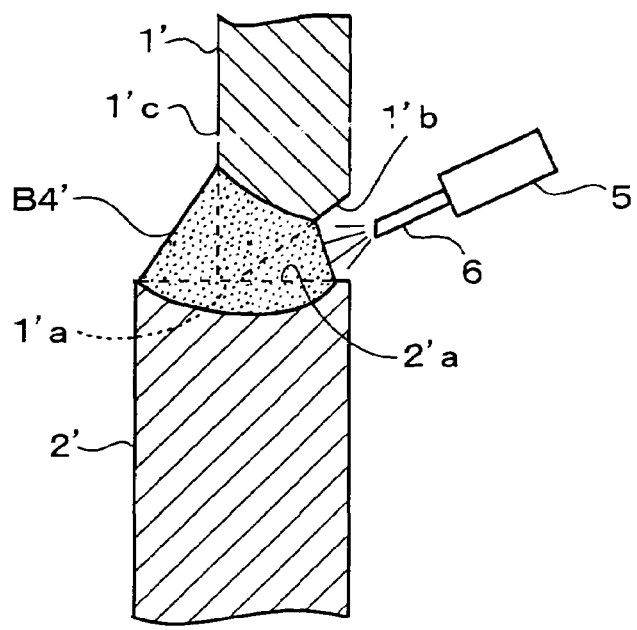
FIG. 6 is a schematic view illustrating an example of butt welding work on plates having different thicknesses in accordance with Example 3 of a first embodiment of the present invention.
Figure 7:
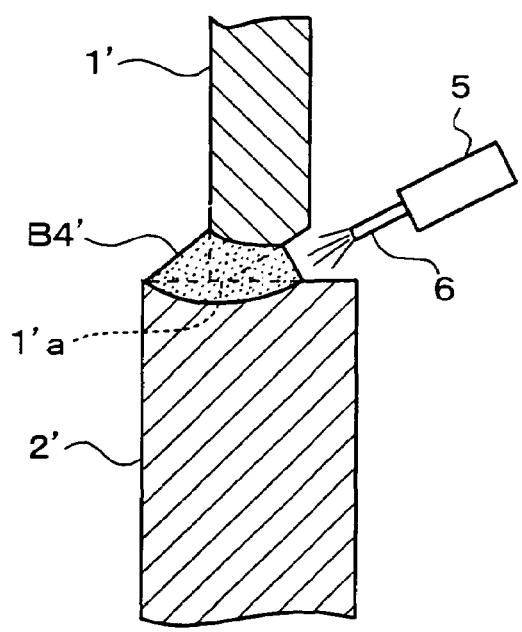
FIG. 7 is a schematic view illustrating another example of the butt welding work on plates having different thicknesses in accordance with Example 3 of the first embodiment of the present invention.

A third example is shown in FIG. 6 and FIG. 7.

FIG. 6 and FIG. 7 are drawings, each of which illustrates the third example in which two plates having different thicknesses are butt-welded. In FIG. 6, a first base material 1' consisting of a plate and a second base material 2' having a greater thickness than the first base material 1' are kept in abutment against each other with one sides thereof being arranged on the same plane. The drawing also shows a root face 1'a of the base material 1', a groove 1'b arranged on one side of an abutted portion of the base material 1', a side 1'c of the base material 1', said side being located on a side opposite to the groove 1'b, and a flat surface 2'a of the second base material 2'. In the butt-welded joint shown in FIG. 6, a bead B4' can also be deposited at an area, where the joint is desired, to form the joint even by one-side welding from the side of the groove if the aimed point of the welding torch 5, i.e., the welding wire 6, the relationship of the welding torch 5, i.e., the welding wire 6 with the groove, and the like are set as conditions as illustrated in FIG. 1 which has been described above.

In the example of FIG. 7 in which the two plates are butt-welded, both of the base materials 1', 2' are arranged with one sides thereof extending in parallel with each other, and the thinner one of both of the base materials 1', 2', that is, the first base material 1' is positioned adjacent a center of the thicker, second base material 2' as viewed in the direction of its thickness such that they are kept in abutment against each other.

FIG. 7 is similar to the above-mentioned example illustrated in FIG. 6, but is different only in the final bead shape on the side of the groove in the welded joint. Accordingly, a description of the example of FIG. 7 is omitted. In the example of FIG. 7, the welding only from the side of the groove, in other words, from the one side can also form the welded joint as a joint which permits well-balanced transmission of force owing to the registration between the centers of the plates as viewed in the directions of their thicknesses.

1.4 Fourth Example

Figure 8:
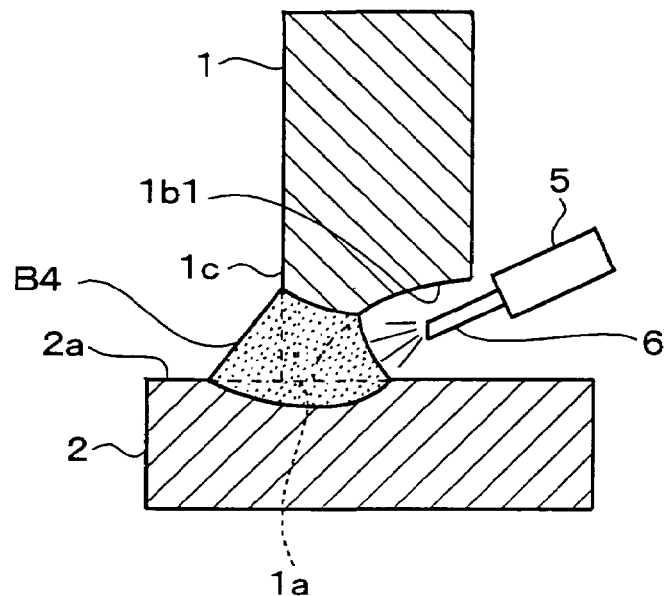
FIG. 8 is schematic view showing a modification of a weldable groove shape in the first embodiment of the present invention.
Figure 9:
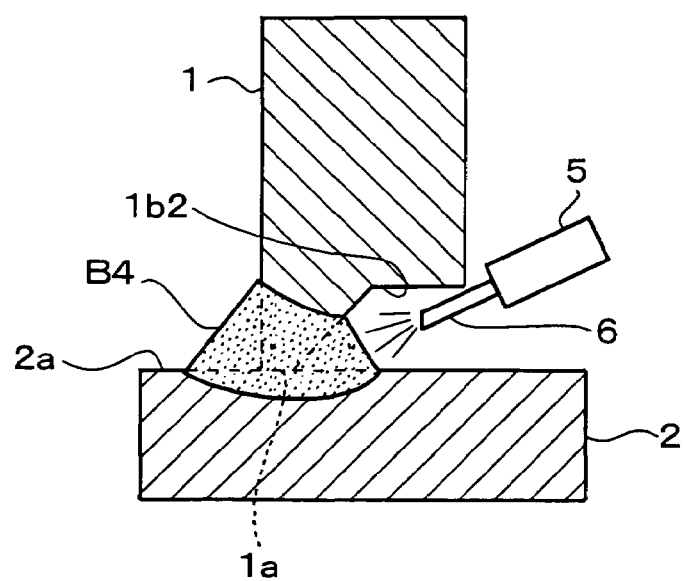
FIG. 9 is schematic view showing another modification of the weldable groove shape in the first embodiment of the present invention.

Other examples of the groove shape weldable by the welding method of the present invention will next be shown in FIG. 8 and FIG. 9.

FIG. 8 shows an example in which a J-shaped, single groove face 1b1 is arranged on a first base material 1, while FIG. 9 illustrates an example in which a single groove face 1b2 is arranged with plural straight lines. In each of these examples, a desired root face 1a is arranged. Similarly to the above-mentioned case of the single bevel groove, a bead B4 in the form of a fillet weld can, therefore, be formed by arc welding from one side between a back side 1c of the first base material 1, said back side being located on the back side of the groove, and a flat surface 2a of a second base material 2 even if the groove shape is other than a single bevel groove.

1.5 Aimed Point $P_2$ and the Results of Welding

Figure 24:
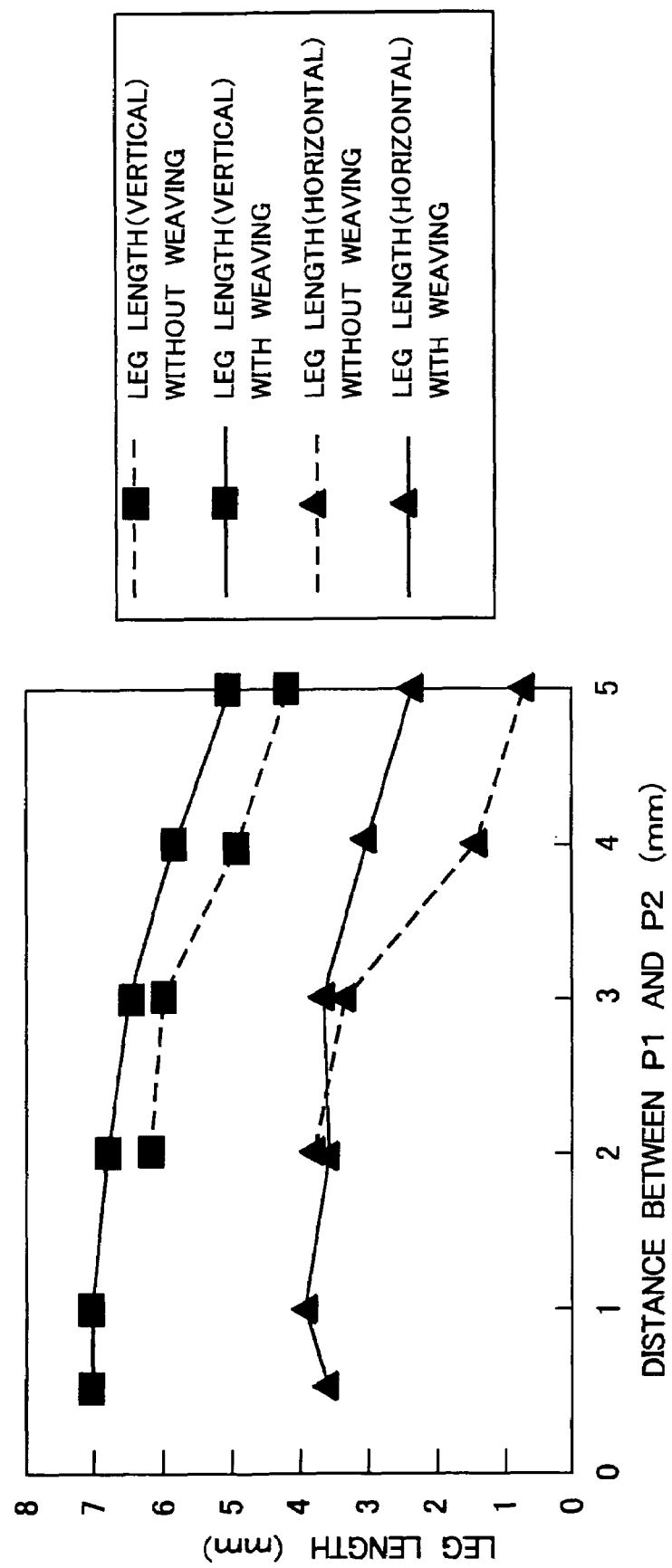
FIG. 24 is a diagram illustrating, as a graph, a relationship between the leg length of a bead in the form of a fillet weld as formed on the back side of a groove and the aimed point of a welding apparatus to which a welding method according to the present invention is applied.

FIG. 24 is a diagram illustrating, as a graph, a relationship between the leg length of a bead in the form of a fillet weld as formed on the back side of a groove and the aimed point of a welding apparatus to which a welding method according to the present invention is applied.

As shown in FIG. 24, the leg length of the bead B4 to be formed between the back side 1c of the first base material 1, said back side being located on the back side of the groove, and the flat surface 2a of the second base material 2 is formed in a range of from about 4 to 7 mm in the vertical direction when the distance d between the contact position $P_1$ and the aimed point $P_2$ is in a range of from 2 to 5 mm. Even when the distance d between $P_1$ and $P_2$ exceeds 4 mm, the bead B4 can still be formed between the back side 1c of the first base material 1 and the flat surface 2a of the second base material 2 although the leg length of the bead B4 is undesirably shortened to 1 mm or so in the horizontal direction. Further, this bead B4 is formed with a desired horizontal leg length of about 4 mm or so when the distance d between $P_1$ and $P_2$ is in a range of from 2 to 3 mm.

As described above, owing to the difference in thermal capacity between the first base material with the single groove face 1b arranged thereon and the second base material having the flat surface 2a and the fusion of the welding wire, this embodiment makes it possible to weld the groove and also to stably deposit the bead B4 in the form of a fillet weld between the back side 1c of the first base material 1, said back side being located on the back side of the groove, and the flat surface 2a of the second base material 2.

Described specifically, a greater portion of an arc is caused to generate on (a greater portion of the heat of an arc is caused to be transferred to) the side of the second base material 2 of larger thermal capacity. On the side of the single groove face 1b of the first base material 1 of smaller thermal capacity, the base material 1 is caused to fuse wholly to the back side 1c on the back side of the groove to such an extent that no punch-through takes place, and further, fusion of the welding wire 6 forces a melt out to the back side of the groove while filling up the groove. The bead B4 in the form of the fillet weld can be formed accordingly.

If there is a further part to be welded in another groove, its welding in a similar manner as in conventional art makes it possible to form a desired "T" joint.

On the inner side of a box-shaped, welded structure, beads in the form of fillet welds can, therefore, be deposited in a groove and on the back side of the groove, respectively, by simply arranging the groove on the outer side of a joint to be butt-welded and conducting arc welding from the side of the groove. As a consequence, a joint can be fabricated while retaining the strength, and no work is needed to arrange a bead in advance and hence, the efficiency of the welding work can be significantly improved.

Even in such a structure that includes such a joint part as permitting no welding from the back side of a groove and thus unavoidably requiring use of thicker base materials for being to be welded together, a bead in the form of a fillet weld can also be deposited on the back side of the groove by performing arc welding only from one side without leaving any part undeposited in the groove. It is, therefore, possible to reduce the thicknesses of base materials without a reduction in the strength of the resulting structure.

2. Second Embodiment

Figure 10:
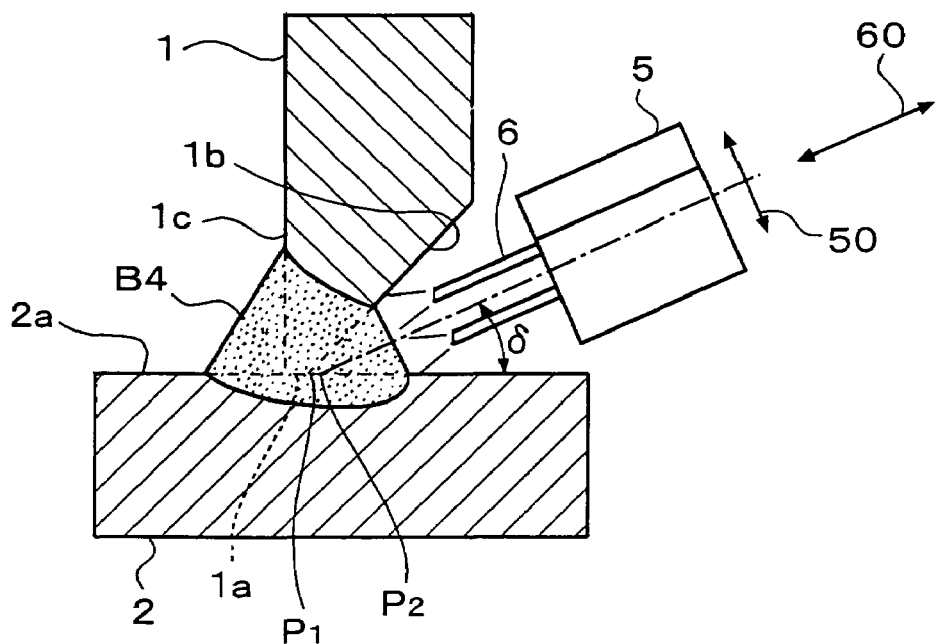
FIG. 10 is a schematic view illustrating welding work for a "T" joint by a second embodiment of the present invention.

FIG. 10 is a schematic view illustrating a second embodiment of the welding method according to the present invention, and shows welding work for a "T" joint. In this embodiment, elements equivalent to the corresponding elements in the above-described first embodiment are designated by like reference signs, and overlapping descriptions are omitted.

In this second embodiment, a welding wire 6 held in place on a welding torch 5 and fed by unillustrated feeding means is held at an inclination a relative to a flat surface 2a of a second base material 2 while being directed to an aimed point $P_2$. In this embodiment, welding is performed while causing the welding wire 6 to weave. The weaving is effected by driving the welding torch 5 under control such that the welding wire 6 oscillates at a predetermined amplitude in the direction of an arrow 50 while maintaining the above-described inclination ä. The amplitude and pitch of oscillation for the weaving are determined depending on the thickness of a first base material 1, the size of a groove, etc.

Even when welding is performed while causing the welding wire 6 to weave as described above, an arc is directed more toward the side of the flat surface 2a of the second base material 2 of greater thermal capacity while the predetermined inclination ä is always maintained. As the oscillation is effected in this state, a molten pool is forced out to the back side of the groove so that a bead B4 in the form of a fillet weld can be deposited between the back side 1c of the first base material 1, said back side being located on the back side of the groove, and the flat surface 2a. In this manner, efficient welding is feasible even where the groove angle è is rather large.

As an alternative, the welding wire 6 can also be caused to weave in the direction of its axis as indicated by an arrow 60 in the same drawing, that is, FIG. 10. In this case, a bead B4 in the form of a fillet weld can also be caused to deposit between the back side 1c of the first base material 1, said back side being located on the back side of the groove, and the flat surface 2a of the second base material 2 by forcing out a molten pool to the back side of the groove under arc force or the like.

3. Third Embodiment

Figure 11:
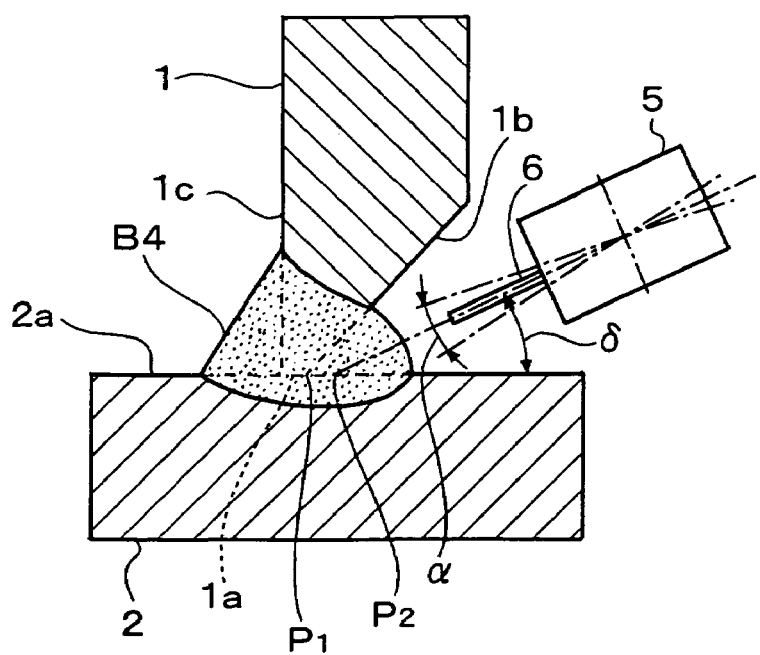
FIG. 11 is a schematic view illustrating welding work for a "T" joint by a third embodiment of the present invention.

FIG. 11 is a schematic view illustrating a third embodiment of the welding method according to the present invention, and shows welding work for a "T" joint. In this embodiment, elements equivalent to the corresponding elements in the first and second embodiments are designated by like reference signs, and overlapping descriptions are omitted.

In the third embodiment, weaving of a welding wire 6 is performed by driving a welding torch 5 under control such that a tip of a welding wire 6 is swung in the form of a circular arc over á degrees about a predetermined inclination ä as a center. In this third embodiment, a bead B4 in the form of a fillet weld can also be deposited between a back side 1c of a first base material 1, said back side being located on the back side of the groove, and a flat surface 2a as in the above-mentioned embodiments.

4. Fourth Embodiment

Figure 12:
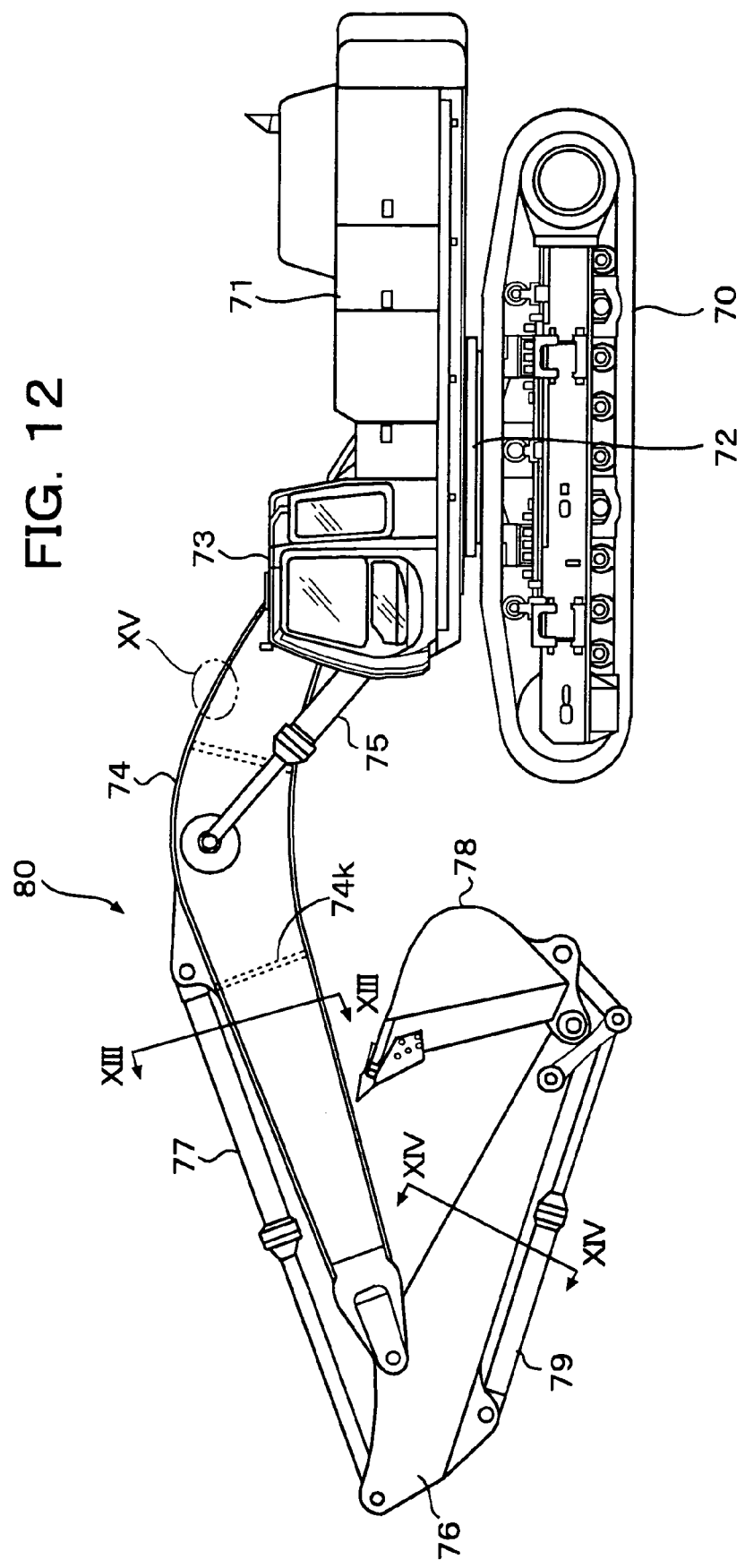
FIG. 12 is a front elevation of a hydraulic excavator equipped with welded structures fabricated by a welding method according to a fourth embodiment of the present invention.

FIG. 12 is a front elevation of a hydraulic excavator as a welded structure fabricated by the welding method according to the present invention.

In FIG. 12, the hydraulic excavator comprises a travel base 70, an upperstructure 71 mounted for revolution on the travel base 70, and a revolving mechanism 72 for causing the upperstructure 71 to revolve. This revolving mechanism 72 can cause the upperstructure 71 to revolve over 360 degrees relative to the travel base 70. The travel base 70 is provided with a travel track frame, drive wheels arranged on the travel track frame, crawlers wrapped on the drive wheels, etc., and allows the hydraulic excavator to travel.

The upperstructure 71 has an unillustrated revolving frame, and is provided with various hydraulic equipment such as an engine and hydraulic pumps, an operator's cab 73, etc. By operating control devices arranged in the operator's cab 73, an operator can drive the travel base 70, working equipment 80 to be described subsequently herein, and the like. The working equipment 80 is generally constructed of a boom 74 arranged pivotally up and down on the upperstructure 71, a boom cylinder 75 for driving the boom 74, an arm 76 pivotally arranged on the boom 74, an arm cylinder 77 for driving the arm 76, a bucket 78 attached to the arm 76, a bucket cylinder 79 for driving the bucket 78, and the like.

Elements making up the above-described hydraulic excavator, such as the track frame, the revolving frame, the boom 74 and the arm 76, are welded structures formed by combining welded joints typified by "T" joints. As their cross-sectional shapes are approximately box-shaped in many instances, it is difficult to arrange auxiliary beads, backing strips or the like on their back sides. The present invention can, however, overcome this difficulty.

Figure 13:
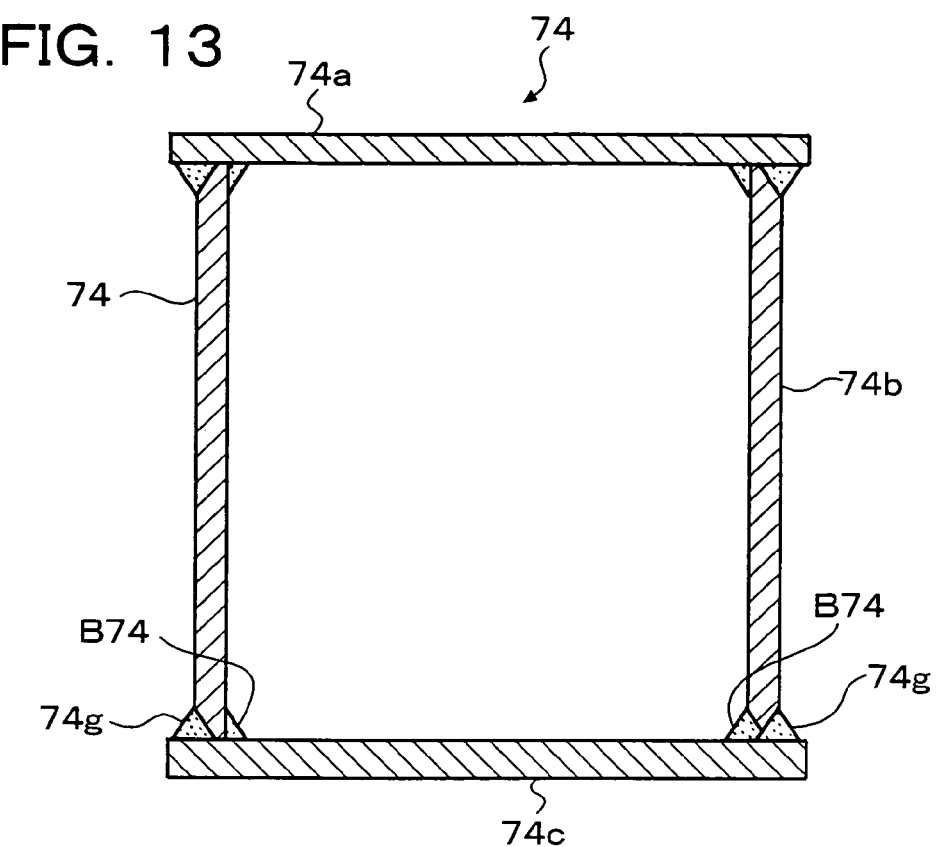
FIG. 13 is a cross-sectional view taken along XIII—XIII of FIG. 12.
Figure 14:
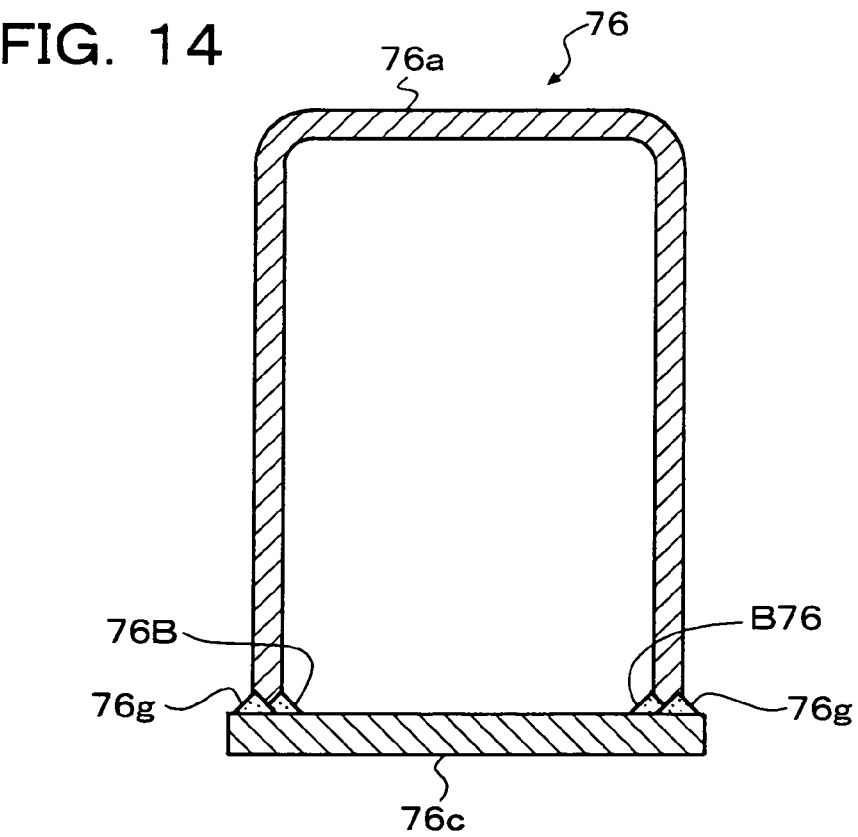
FIG. 14 is a cross-sectional view taken along XIV—XIV of FIG. 12.
Figure 15:
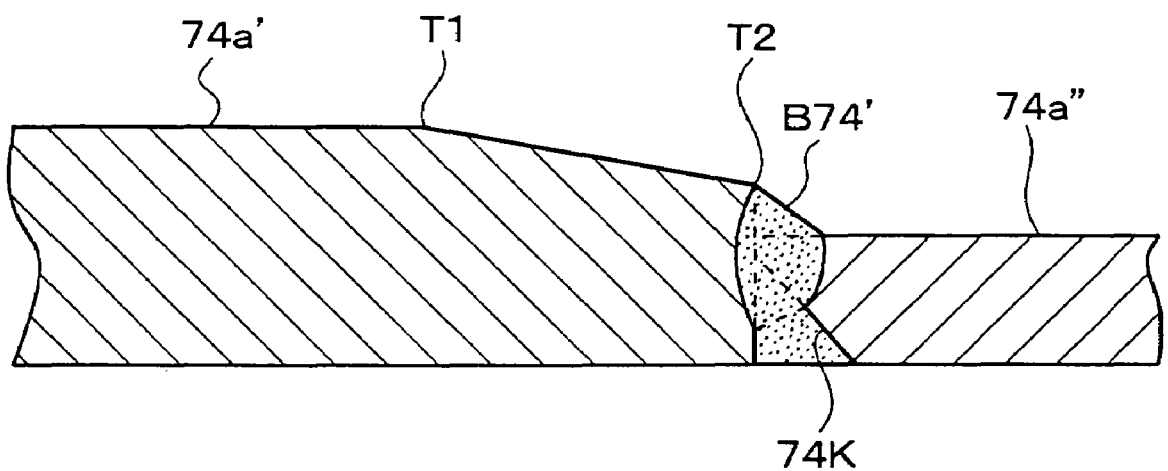
FIG. 15 is a cross-sectional view depicting a butt-welded joint between upper plates of different thicknesses in a boom of the hydraulic excavator, said butt-welded joint being designated at sign XV in FIG. 12.

FIG. 13 is a cross-sectional view taken along XIII—XIII of FIG. 12, FIG. 14 is a cross-sectional view taken along XIV—XIV of FIG. 12, and FIG. 15 is a cross-sectional view of a part designated at sign XV in FIG. 12. More specifically, FIG. 13 is across-sectional view of the boom 74 of the hydraulic excavator in FIG. 12, FIG. 14 is a cross-sectional view of the arm 76 of the hydraulic excavator in FIG. 12, and is a cross-sectional view showing a butt-welded joint part of upper plates themselves of different thicknesses in the boom of the hydraulic excavator. These boom 74 and arm 76 are in the forms of box-shaped, welded structures, and in FIG. 15, a butt-welded joint between a thick plate member 74a' and a thin plate member 74a", both of which make up an upper plate of the boom 74, is formed.

The boom 74 is constructed of an upper plate 74a, a left and right side plates 74b, 74b, and a lower plate 74c. Upon forming the boom 74 by applying the welding method of the present invention, each side plate 74b with a root face formed thereon and also with a single groove face arranged on an outer side thereof is brought into abutment against the lower plate 74c having a flat surface, and welding work is performed from the side of the groove by using the above-mentioned welding method shown in FIG. 1. This welding work can form a bead 74g in the groove between the single groove face of the side plate 74b and the flat surface of the lower plate 74c, and can also deposit a bead B74 in the form of a fillet weld between the inner wall of the side plate 74b and the flat surface of the lower plate 74c. According to this embodiment, a box-shaped, welded structure welded also on the inner side of the structure can be fabricated by welding work only from the outside of the structure without needing arranging a backing strip or arranging a bead for the prevention of a burn-through, a punch-through or the like and further, without needing arranging an access hole or the like for a worker to perform welding on the side plates 47b inside the structure.

Needless to say, the present invention can also be applied to the welding between the upper plate 74a and the side plates 74b. When a welding torch or the like can be inserted between both of the side plates 74b, 74b and a sufficient space is available there, it is possible, as in the conventional art, to bring the side plates 74b, 74b, on outer sides of which grooves are arranged, into abutment against the upper plate 74a to perform fillet welding to the grooves from the outside and then to perform fillet welding from the back sides of the grooves.

On the other hand, the arm 76 is constructed of a square U-shaped member 76a, which forms a box-shaped structure and has been formed by pressing or the like, and a plate-shaped member 76c which makes up the remaining one side. Upon forming the arm 76 by the welding method of the present invention, the member 76a with root faces formed thereon and also with single groove faces formed on the outer sides of the root faces is brought into abutment against the lower plate 76c having a flat surface, and by using the above-mentioned welding method shown in FIG. 1, welding is performed from the side of the grooves. By this welding, beads 76g can be formed in grooves between the single groove faces of the member 76a and the flat surface of the lower plate 76c, and further, beads B76 in the form of fillet welds can also be deposited between the surfaces on the back side of the grooves of the member 76a and the flat surface of the lower plate 76c.

As has been described above, even in a welded structure such as that illustrated in FIG. 14, a box-shaped, welded structure welded also on the inner side of the structure can be fabricated by welding work only from the outside of the structure without needing arranging backing strips or arranging beads for the prevention of a burn-through, a punch-through or the like and further, without needing arranging an access hole or the like for a worker to perform welding on the side portions of the member 76a inside the structure.

FIG. 15 is a cross-sectional view depicting the butt-welded joint of the upper plates themselves of different thicknesses in the boom of the hydraulic excavator, said butt-welded joint being designated at sign XV in FIG. 12. It is the butt-welded joint of the thick plate member 74a' and the thin plate member 74a", both of which make up the upper plate of the boom 74. Both of the members 74a', 74a" are kept in abutment at end portions thereof such that as viewed in the drawing, their lower surfaces lie in the same plane. The member 74a" is provided with a single groove face 74k. In this embodiment, the thick plate member 74a' is provided with a tilted surface extending toward an area of its abutment with the thin plate member 74a", for example, between a position T1 and a position T2 so that no extreme change occurs in strength.

In the welded joint illustrated in FIG. 15, the welding method illustrated with reference to FIG. 6 in connection with the third example of the first embodiment is applied, and welding is performed from the side of the groove 74k such that an arc is generated at a predetermined inclination relative to the butted end face of the member 74a'. As a result, a bead B74' in the form of a fillet weld can be formed between the butted end face of the member 74a' and the back side of the member 74a", said back side being located on a side opposite the single groove face 74k.

5. Fifth Embodiment

FIG. 16 through FIG. 21 are intended to describe a fifth embodiment of the present invention. In this embodiment, elements equivalent to the corresponding elements described above are designated by like reference signs, and overlapping descriptions are omitted.

5.1 Overall Construction

Figure 16:
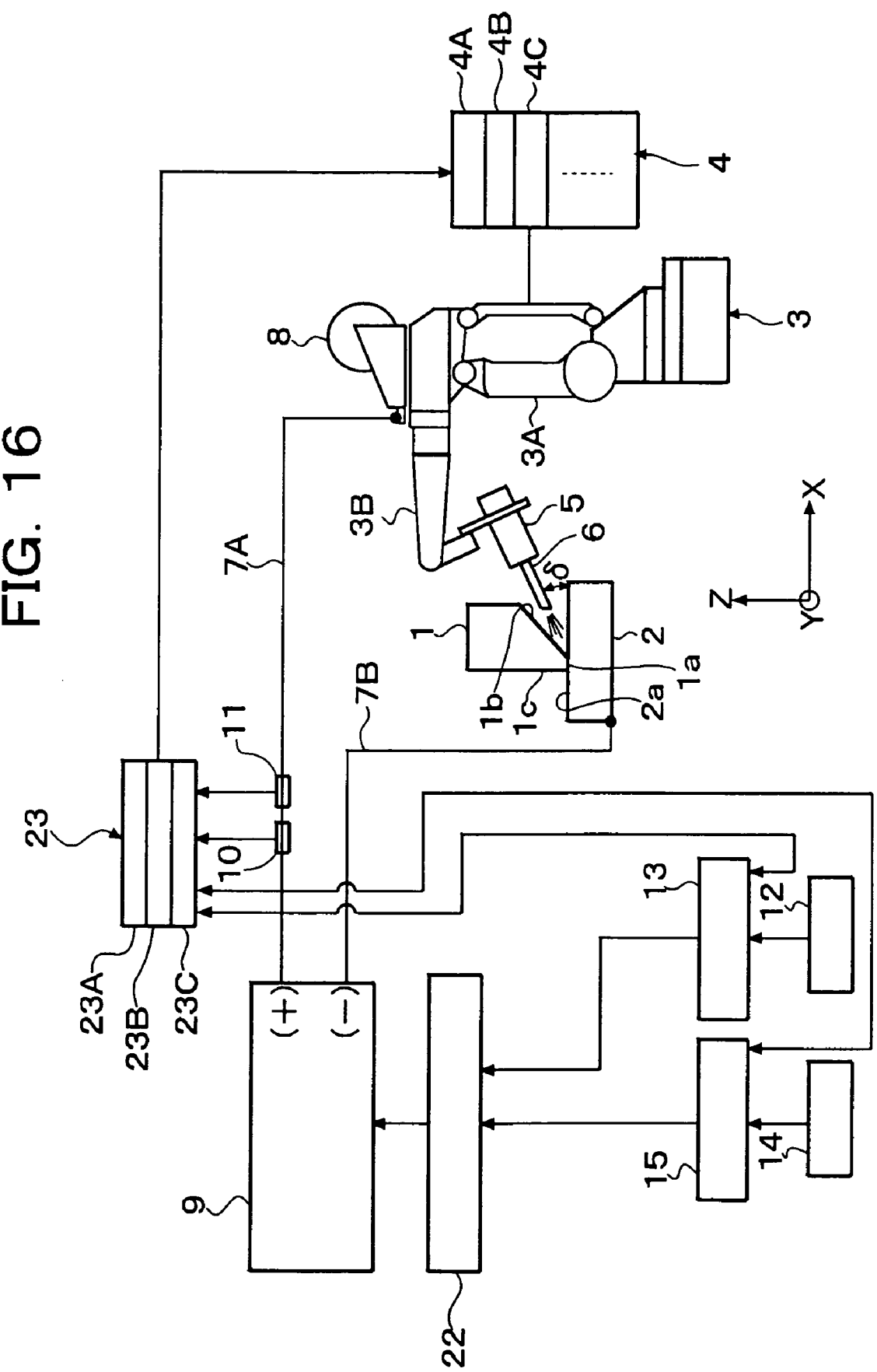
FIG. 16 is a diagram showing the construction of a welding apparatus according to a fifth embodiment of the present invention.

FIG. 16 is a diagram showing the outline construction of a welding apparatus according to this embodiment. In the drawing, the welding apparatus is constructed basically of a robot main body 3, a robot controller 4, and a first and second base materials 1, 2 to be welded. The first base material 1 is provided at an end portion on its abutted side with a single groove face 1b which serves to form a single bevel groove. A portion of the second base material 2, said portion being kept in abutment with the first base material 1, is formed as a flat surface.

The robot main body 3 is constructed such that it can perform revolution and pitching. The robot main body 3 is provided with a parallel link mechanism 3A, and on the parallel link mechanism 3A, a robot arm 3B is arranged. Further, the robot main body 3 is controlled by the robot controller 4. This robot controller 4 is arranged to output command signals such that the robot arm 3B is driven under control in the directions of at least three orthogonal axes X, Y, Z shown in the drawing. The robot controller 4 is provided with an input unit 4A for inputting and storing various preset values and the like for control, a position control unit 4B for controlling the position and attitude of the robot arm 3B, a speed control unit 4C for controlling the welding speed, etc. A welding torch 5 is arranged on a free end of the robot arm 3B, a welding wire 6 is held in place on the welding torch 5, and the welding wire 6 is fed by a feeder 8 through the torch 5. Designated at signs 7A and 7B are cables for feeding welding electric power. The cable 7A is connected to the welding wire 6 on the side of the feeder 8 which the robot is provided with, while the cable 7B is connected to the base material 1 or 2 to be welded. The cables 7A, 7B are connected to a welding power source 9, thereby connecting the welding wire 6 and the base material 1 or 2 to the welding power source 9. A voltage detector 10 and current detector 11 are attached to the cable 7A, so that the voltage of a welding current to be fed from the welding power source 9 to the welding wire 6 is detected by the voltage detector 10 and the welding current to be fed from the welding power source 9 to the welding wire 6 is detected by the current detector 11. Incidentally, the welding voltage and welding current so detected are inputted to a power diagnosis unit 23.

At a preceding stage of the welding power source 9, an output control device 22 is arranged. At a preceding stage of the output control device 22, a voltage control device 13 and current control device 15 are arranged in parallel with each other. At a preceding stage of the voltage control device 13, an average voltage setting device 12 is arranged, and at a preceding stage of the current control device 15, an average current setting device 14 is arranged. The average voltage setting device 12 sets an average level of an voltage to be fed to the welding wire 6. The voltage control device 13 compares the average voltage level set at the average voltage setting device 12 with an actual average voltage inputted via the below-described power diagnosis unit 23 on the basis of an actual voltage detected by the voltage detector 10, and outputs a voltage control signal. The average current setting device 14 sets an average level of a current to be fed to the welding wire 6, and the current control device 15 compares the average current level set at the average current setting device 14 with an actual average current inputted via the below-described power diagnosis unit 23 on the basis of an actual current detected by the current detector 11, and outputs a current control signal. Inputted to the output control device 22 are the voltage control signal from the voltage control device 13 and the current control signal from the current control device 15. Based on these control signals, the output control device outputs a control signal to control electric power to be fed from the welding power source 9.

The power diagnosis unit 23, to which detection outputs are inputted from the voltage detector 10 and current detector 11, is composed of an input unit 23A, a comparison unit 23B and an output unit 23C. The input unit 23A sets a first preset voltage level higher in voltage than the average voltage level set by the average voltage setting device 12, a second preset voltage level lower in voltage than the average voltage level set by the average voltage setting device 12, and a preset current level higher in current than the average current level set by the average current setting device 14. The comparison unit 23B compares an actual voltage inputted from the voltage detector 10 with the above-described, first and second preset voltage levels, and outputs a position control signal, which is to be described subsequently herein, to the robot controller 4. Further, the comparison unit compares an actual current inputted from the current detector 11 with the above-described, first preset current level or second preset voltage level, and outputs a position control signal to the robot controller 4. The output unit 23C outputs the detected actual voltage and actual current from the voltage detector 10 and current detector 11 to the voltage control unit 13 and current control unit 15, respectively. In addition, the welding apparatus is equipped with a computer or the like, which systematically controls the individual controller and control devices, the robot and the like.

5.2 Operation

Welding operation which makes use of the welding apparatus constructed as described above is performed as will be described hereinafter.

In FIG. 16, the welding torch 5 is mounted on the robot arm 3B. The welding wire 6 is held in place on the welding torch 5, extends over a predetermined length from the free end of the welding torch 5, and is fed by the welding wire feeder 8. As illustrated in FIG. 1, the welding wire 6 is inserted into a groove formed as a result of contact between a first base material 1, on which a single groove face 1b is formed, and a second base material 2 having a flat surface 2a. At this time, the welding wire 6 is arranged such that it is tilted at a predetermined inclination ä relative to the flat surface 2 and is directed toward a predetermined, aimed point $P_2$. Such a position control is performed by the input unit 4A and position control unit 4B in the robot controller 4. Further, a moving path and welding speed are inputted from the input unit 4A to the speed control unit 4C, and based on them, the welding wire 6 is caused to move in a direction perpendicular to the drawing sheet. From the input unit 23A in the power diagnosis unit 23, first and second, preset voltage levels and current levels are inputted in advance, and they are stored in the comparison unit 23B.

With the welding apparatus preset as described above, arc welding of a first layer is initiated. As soon as the welding begins, the voltage detector 10 and current detector 11 detect an actual voltage and actual current in the cable 7A, respectively. If the welding wire 6 is caused to move too much, for example, toward the side of the groove of the first base material 1 during the welding due to vibrations of the robot or positional displacements of the first and second base materials 1,2, an end portion of the first base material 1 of smaller thermal capacity, said end portion being located on the side of the single groove face 1b, is caused to burn through, thereby making it impossible to form a bead. When the end portion of the first base material 1, said end portion being located on the side of the single groove face 1b, undergoes a burn-through, the arc strikes through the first base material 1 to its back side so that the actual voltage becomes higher. The comparison unit 23B in the power diagnosis unit 23 compares the first and second preset voltage levels, which were inputted in advance, with the actual voltage and, if the actual voltage exceeds the first preset voltage level, outputs a position control signal to the position control unit 4B in the robot 3 such that the welding wire 6 is caused to move toward the second base material 2. As a result, the welding wire 6 is corrected in position such that it moves from the side of the first base material 1 toward the second base material 2.

If the relative positional relationship between the welding wire 6 and the first and second base materials 1,2 is changed such that the welding wire 6 is conversely caused to move from the preset position toward the side of the second base material 2, a thermal input into the first base material 1 is reduced so that a melt is no longer forced out to the back side of the groove and the melt accumulates on the near side. This leads to a decrease in the extension of the welding wire 6, resulting in occurrence of a phenomenon that the actual voltage becomes lower and the actual current becomes higher. The comparison unit 23B then compares the preset voltage levels, which were inputted beforehand, with the actual voltage and, if the actual voltage falls below the second preset voltage level, outputs a position control signal to the position control unit 4B such that the welding wire 6 is caused to move toward the groove. As a result, the welding wire 6 is corrected in position to move toward the first base material 1. As an alternative, because the actual current has been detected by the current detector 11, the comparison unit 23B compares the preset current level, which was inputted in advance, with the actual current and, if the actual current is higher than the preset current level, outputs a position control signal to the position control unit 4B such that the welding wire 6 is caused to move toward the first base material 1. The welding wire 6 may be corrected in position to move toward the first base material 1 in this manner.

The output unit 23C in the power diagnosis unit 23, on the other hand, outputs the actual voltage and actual current, which have been detected by the voltage detector 10 and current detector 11, to the voltage control device 13 and current control device 15, respectively. At the voltage control device 13, the preset average voltage level and the actual voltage are compared with each other to output a voltage control command signal to the output control device 22 such that the actual voltage becomes equal to the preset average voltage level. The current control device 15, on the other hand, compares the preset average current level and the actual current with each other, and outputs a current control command signal to the output control device 22 such that the actual current becomes equal to the preset average current level. Based on the voltage control command signal and current control command signal so inputted, the output control device 22 outputs control signals to the welding power source 9 to adjust the voltage and current to be fed from the welding power source 9 so that the electric power to be fed is adjusted to the preset values.

In the welding apparatus according to this embodiment, welding is performed while correcting the positional relationship between the welding wire 6 and the first and second base materials 1,2 by moving the welding wire to the preset position and also while correcting the average voltage and average current to the present values, as described above. By conducting welding only from the side of the groove, stable welding can therefore be performed without leaving any undeposited part in the groove while depositing a bead in the form of a fillet weld on the back side 1c of the first base material 1, which is located on the back side of the groove, and the flat surface 2a of the second base material 2.

5.3 Welding Under Weaving

With the welding apparatus according to this embodiment, welding can also be performed while causing the welding wire 6 to weave. Weaving is effected as explained above with reference to FIG. 10, namely, by causing the welding torch 5 and welding wire 6 to oscillate with a predetermined oscillation width as indicated by the arrow 50 or arrow 60 while keeping their attitudes tilted at a predetermined inclination ä or as explained above with reference to FIG. 11, namely, by causing the welding wire 6 to oscillate and swing tracing a circular arc about the inclination ä as a center. These weaving operations are effected by control signals transmitted from the position control unit 4B to the robot on the basis of the input signals inputted beforehand from the input unit 4A of the robot 3.

Figure 17:
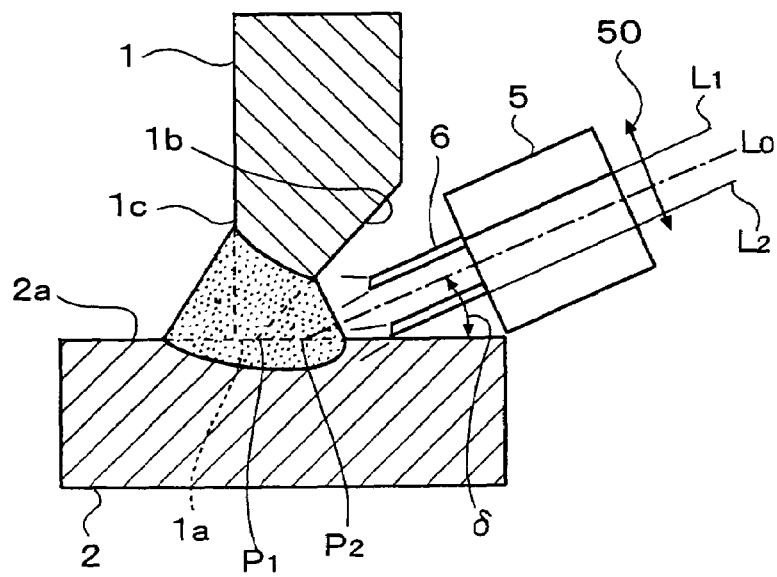
FIG. 17 is a schematic view illustrating an example of weaving operation of a welding wire in the welding apparatus shown in FIG. 16.
Figure 18:
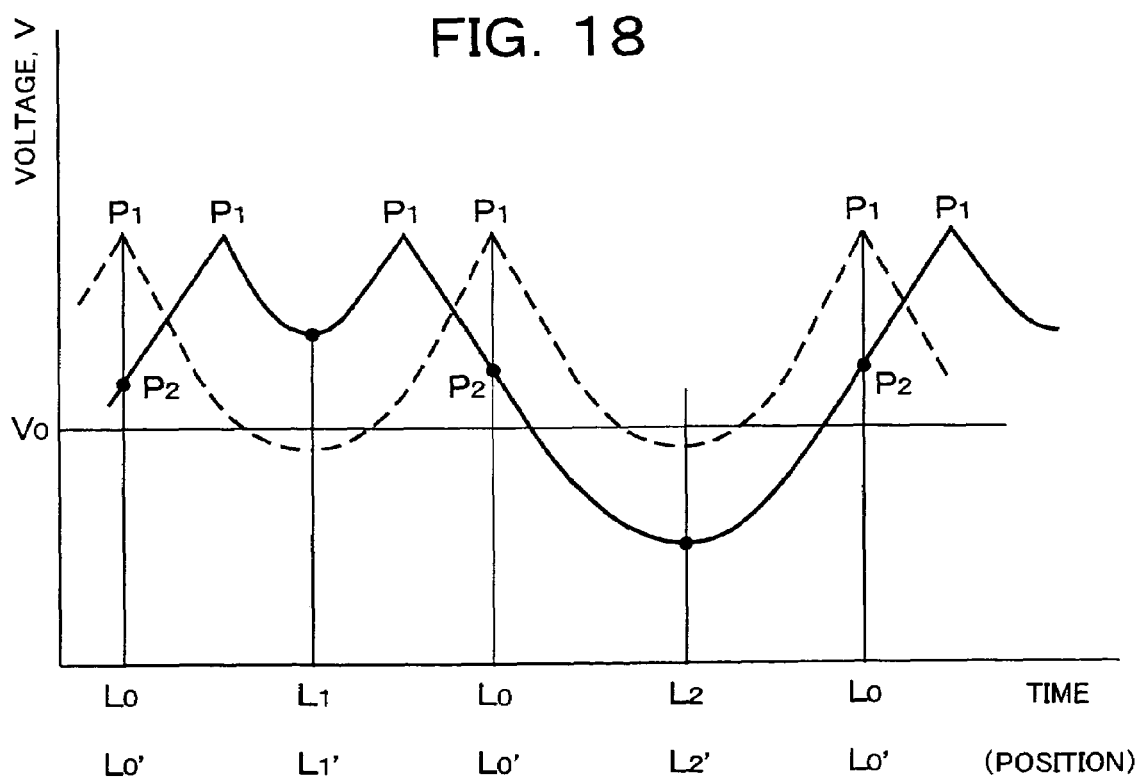
FIG. 18 is a diagram showing a relationship between the weaving position of the welding wire and the welding voltage generated in the welding wire under such welding conditions that minimize the forcing-out of a melt to the back side of a groove by the welding apparatus shown in FIG. 16.

Examples of the weaving are shown in FIG. 17 and FIG. 18. FIG. 17 is a schematic view illustrating an example of weaving operation of a welding wire by the welding apparatus shown in FIG. 16, and FIG. 18 is a diagram showing a relationship between the weaving position of the welding wire and the welding voltage generated in the welding wire under welding conditions which minimize the forcing-out of a melt to the back side of a groove by the welding apparatus shown in FIG. 16.

The characteristics indicated by a solid line in FIG. 18 indicate the relationship between the weaving position (time) and the welding voltage generated in the welding wire 6 in the case that, as illustrated in FIG. 17, a center of oscillation width of weaving when the welding torch 5 and welding wire 6 were tilted at the predetermined inclination ä relative to the flat surface 2a of the second base material 2 and were directed toward the aimed point $P_2$ was designated by $L_0$ and the welding torch 5 and welding wire 6 were caused to oscillate from the center $L_0$ to the position $L_1$ on the side of the first base material 1 and in the case that the welding torch 5 and welding wire 6 were caused to oscillate from the center $L_0$ to a position $L_2$ on the side of the second base material 2. To simplify the description, the diagram represents a case in which the predetermined inclination a was set at ½ of the angle of the single bevel groove on the first base material 1 and the weaving center $L_0$ shown in FIG. 17 was set at a position directed toward the aimed point $P_2$.

The characteristics indicated by a dashed curve in FIG. 18, on the other hand, indicate the relationship between the weaving position (time) and the welding voltage generated in the welding wire 6 in the case that the inclination ä of the welding wire 6 was set at ½ of the angle of the single bevel groove as in the above-mentioned cases, the aimed point of the welding wire 6 was set at the position of contact $P_1$ where the end portion of the single groove face 1b is in contact with the flat surface 2a of the second base material 2, the weaving center of the welding wire 6 was set at $L_{0'}$ (not shown; this will apply equally hereinafter), and the welding wire 6 was caused to oscillate from the center $L_{0'}$ to a position $L_{1'}$ on the side of the first base material 1 and in the case that the welding wire 6 was caused to oscillate to a position $L_{2'}$ of the second base material 2 ($L_{1'}=L_{2'}$). In those cases, however, the welding conditions were selected such that the forcing-out of a melt to the back side of the groove by an arc would be minimized.

Now assume that weaving is performed with the aimed point set at the contact position $P_1$. When the weaving center $L_{0'}$ is directed toward the contact position $P_1$, the welding wire 6 located at the center $L_{0'}$ defines a relatively longest distance from the tip of the welding wire 6 to the groove and therefore, the welding voltage takes the highest value as indicated by the dashed line in FIG. 18. If the welding wire 6 is caused to oscillate toward the first base material 1 subsequently, the distance between the tip of the welding wire 6 and the first base material 1 becomes gradually shorter so that, as indicated by the dashed line in FIG. 18, the voltage gradually drops and becomes lowest at the position $L_{1'}$ where the welding wire 6 is located closest to the first base material 1. When the welding wire then begins to return toward the second base material 2, the voltage, as indicated by the dashed line in FIG. 18, gradually rises back and becomes highest again at the center $L_{0'}$ of oscillation, and then becomes lowest at the position $L_{2'}$ where the welding wire is located closest to the second base material 2. This is repeated.

A description will next be made of a weaving operation when, as illustrated in FIG. 17, the aimed point of the welding wire 6 was set at $P_2$, the position where the inclination angle was ä was set at the weaving center $L_0$ and the welding wire 6 was caused to oscillate from the center $L_0$ to the position $L_1$ on the side of the first base material 1, and also of a weaving operation when the welding wire 6 was caused to oscillate to the position $L_2$ on the side of the second base material 2.

When the welding wire 6 is located at the weaving center $L_0$, the distance between the tip of the welding wire 6 and the groove is not the maximum. As shown in FIG. 18, the voltage in the above case, therefore, takes a value which corresponds to the distance. As the welding wire then moves toward the first base material 1, the voltage, as indicated by the solid curve in FIG. 18, gradually rises, and reaches the maximum voltage when the welding wire 6 has directed toward the contact position $P_1$. The voltage then gradually drops up to the position $L_1$, and when the welding wire then begins to return toward the second base material 2, the voltage reaches the maximum voltage again at the contact position $P_1$. Because the welding wire thereafter gradually moves closer to the second base material 2, the voltage drops to the lowest voltage at the position $L_2$. This is repeated.

The relationship between the position of the welding wire 6 and the voltage can be determined either empirically or by calculation in accordance with preset conditions such as the groove shape, the aimed point and the inclination. These values are set beforehand from the input unit 23A to the comparison unit 23B in the power diagnosis unit 23.

Here, it is to be noted that positional control on the welding torch 5 for the above-described weaving is set beforehand from the input unit 4A to the position control unit 4B in the robot controller 4. Further, welding voltages are detected by the voltage detector 10, and based on the detection values, actual voltages and an actual average voltage are determined by the comparison unit 23B. By a comparison between an actual voltage and a preset average voltage level, the comparison unit 23B determines whether or not an actual aimed point is correct. When an offset has occurred, a position control signal is outputted to the position control unit 4B of the robot controller 4, and the welding torch is controlled such that the aimed point is brought into registration with the preset position.

Further, an actual average voltage $V_0$ is determined by the comparison unit 23B of the power diagnosis unit 23 on the basis of detection values of the voltage detector 10. The value $V_0$ is outputted to the voltage control device 13 via the output unit 23C, and from the voltage control device 13, a command signal is outputted to the output control device 22 such that the actual voltage becomes equal to the preset average voltage level as described above. The voltage is adjusted accordingly.

In the above-described case, the welding conditions were selected such that the forcing-out of a melt to the back side of a groove by an arc would become minimum. When the welding conditions are selected such that a bead will be formed to the maximum on the back side of a groove, on the other hand, and further, when the weaving center $L_0$ shown in FIG. 17 is located on the contact position $P_1$ (in other words, the weaving center is located at the above-mentioned $L_0'$ not shown in the drawing), a welding operation is performed as will be described hereinafter.

Figure 19:
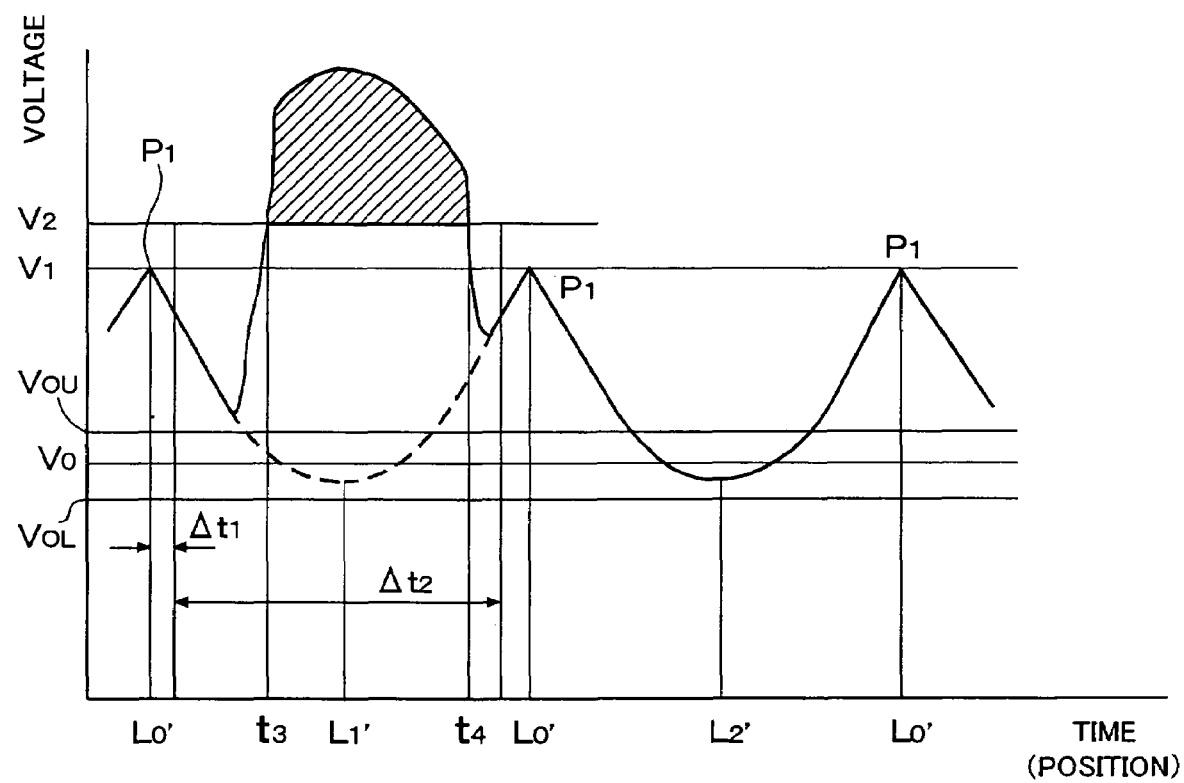
FIG. 19 is a diagram showing a relationship between the weaving position of the welding wire and the welding voltage generated in the welding wire under such welding conditions that maximize the forcing-out of a melt to the back side of a groove by the welding apparatus shown in FIG. 16.

FIG. 19 is a diagram showing a relationship between the weaving position of the welding wire and the welding voltage generated in the welding wire under such welding conditions that maximize the forcing-out of a melt to the back side of a groove by the welding apparatus shown in FIG. 16.

In this case, in a range that the welding wire 6 moves from the above-mentioned, unillustrated center $L_0'$ toward the second base material 2, reaches the position $L_2'$ and then returns to the center $L_0'$, the voltage waveform shows the same locus as the voltage indicated by the above-described, dashed curve in FIG. 18. When the welding wire 6 moves past the center $L_0'$ and is oscillated toward the first base material 1, however, an excessively large quantity of heat enters an end portion of the first base material 1 of small thermal capacity, said end portion being located on the side of the single groove face 1b, at a certain position beyond the center $L_0'$ so that punching-through of an arc to the back side of the groove takes place. An arc is then formed between the tip of the welding wire 6 and the second base material 2, resulting in a sudden increase in the distance therebetween.

As a result, the voltage which has varied following the same locus as the dashed curve in FIG. 18 leaves the locus and increases suddenly. The voltage then rises further little by little because the distance between the tip of the welding wire 6 and the second base material 2 gradually widens until the position $L_1'$ is reached. When the welding wire begins to return from the position $L_1'$ the voltage also begins to drop gradually. Concurrently with elimination of a punching-through as a result of a decrease in the input of heat to the end portion of the first base material 1, the voltage returns onto the above-mentioned locus of the dashed curve in FIG. 18, and on and along the locus, eventually reaches the position $L_0'$.

As has been described above, the time interval during which the voltage suddenly rises when the welding wire 6 is located on the side of the first base material 1 relative to the position $L_0'$ has a correlation with the amount of a bead to be formed on the back side of the groove. Like the above-mentioned, dashed curve in FIG. 18, the formation of a bead is minimized if the time interval during which the voltage suddenly rises does not exist. It has also been found that, if this time interval is too long, on the other hand, punching-through of the arc takes place excessively to separate the first base material 1 and the bead B4 from each other and hence, no good welding results are available.

It is, therefore, necessary to control the duration of this time interval in accordance with a desired amount of a bead to be formed. Especially when there is a time interval during which the voltage rises suddenly, it is necessary to control its duration.

Figure 20:
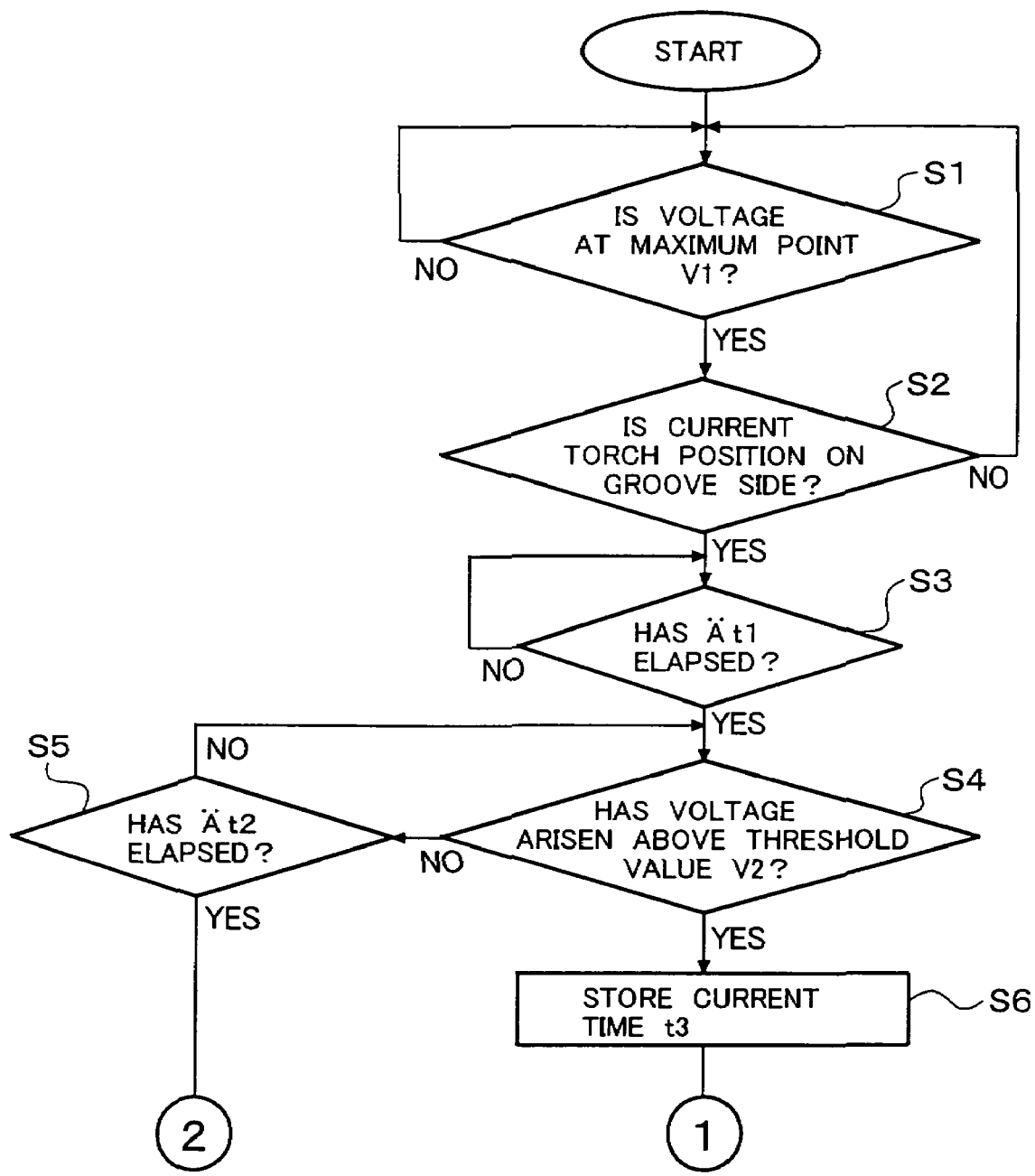
FIG. 20 is a flow chart illustrating a control procedure for the weaving position of the welding wire in the welding apparatus shown in FIG. 16.
Figure 21:
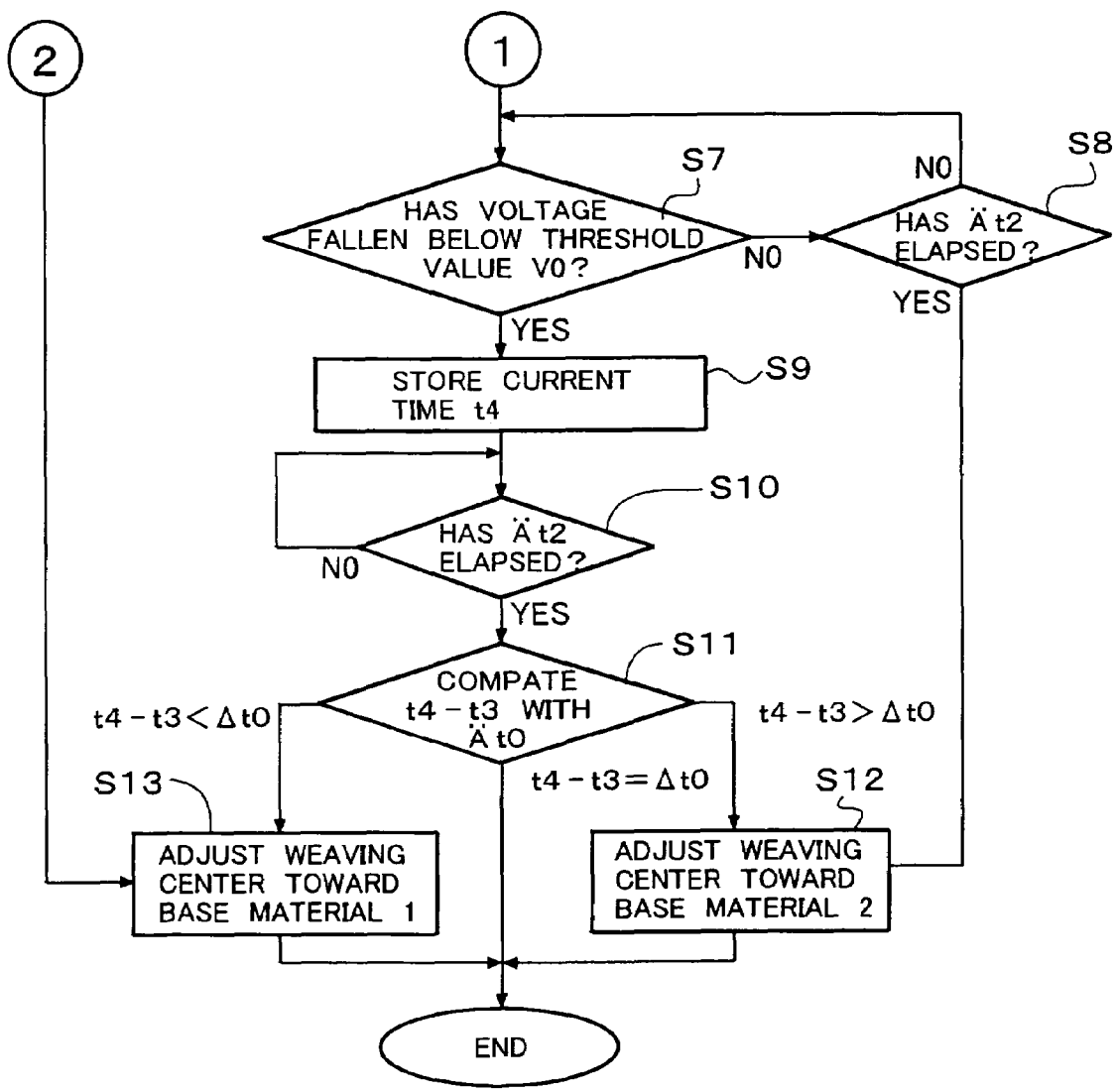
FIG. 21 is a flow chart illustrating a continuation of the control procedure of FIG. 20.

FIG. 20 and FIG. 21 are flow charts illustrating a control procedure for the weaving position of the welding wire in the welding apparatus shown in FIG. 16. This control is performed by the robot controller 4. In this control, the voltage is firstly monitored to check whether or not the voltage is at the maximum point $V_1$. Upon detection of the maximum point $V_1$ (a voltage corresponding to the position $P_1$), it is determined from three-dimensional coordinate data of the robot main body 3 and the direction of an operation of the welding torch 5 whether the current position of the welding torch 5 is on the side of the first base material 1 or on the side of the second base material 2 relative to the weaving center (step S2). The routine returns to step S1 if the current position of the welding torch is on the side of the second base material 2, or awaits an elapse of a first predetermined time $\Delta t1$ if the current position of the welding torch is on the side of the groove (step S3). When the first predetermined time $\Delta t1$ has elapsed, it is determined whether or not the voltage has arisen above a predetermined threshold V2 (step S4). If "NO", it is determined whether or not a second predetermined time $\Delta t2$ has elapsed (step S5). If "YES", step S13 is performed as will be described subsequently herein. If the second predetermined time $\Delta t2$ is not determined to have elapsed, the routine returns to step S4. If the voltage is determined to have arisen above the threshold V2 in step S4, a current time t3 is stored in the input unit 4A (step S6). Subsequent to the storage of the time t3, it is determined whether or not the voltage has fallen below the threshold V2 (step S7). If "NO", it is determined whether or not the second predetermined time $\Delta t2$ has elapsed (step S8). If "YES", step S12 is performed as will be described subsequently herein. If the second predetermined time $\Delta t2$ is not determined to have elapsed, the routine returns to step S7. If the voltage is determined to have fallen below the threshold V2 in step S7, a current time t4 is stored (step S9).

Next, the routine awaits a lapse of the second predetermined time $\Delta t2$ (step S1). If the second predetermined time $\Delta t2$ is determined to have elapsed, the difference between the time t4 and the time t3 (t4–t3) is compared with a target time $\Delta t0$ that permits adequate melting of the end portion of the first base material 1 without being punched through (step S11). If the former is longer than the latter, the amount of punching-through is excessive so that the weaving center is corrected toward the second base material 2 (step S12). If they are equal to each other, the weaving center is left unchanged. If the former is shorter than the latter, the amount of punching-through is insufficient so that the weaving center is corrected toward the first base material 1 (step S13).

If the second predetermined time $\Delta t2$ is determined to have elapsed without the voltage arising above the threshold V2 in step S5, on the other hand, the amount of punching-through is insufficient so that the weaving center is corrected toward the first base material 1 (step S13). If the second predetermined time $\Delta t2$ is determined to have elapsed without the voltage falling below the threshold V2 in step S8, on the other hand, the amount of punching-through is excessive so that the weaving center is corrected toward the second base material 2 (step S12). As an alternative, these cases may be taken as an indication of a poor bead, and a command may be sent to the robot controller 4 to stop the welding.

The amount of the correction of the weaving center in step S12 or step S13 is suitably changed depending on the magnitude of the difference in step 11 and also depending on whether the correction is performed after step S5 or after step S8, and a command is outputted to the robot controller 4. In addition to the correction of the weaving center, welding conditions such as welding current and speed may also be changed.

Further, the threshold V2 and target time $\Delta t0$ and the first and second predetermined times $\Delta t1$, $\Delta t2$ are changed depending on the welding conditions, the groove shape, the target amount of a bead to be formed, etc.

As has been described above, the weaving center can be automatically corrected based on changes in actual voltage as monitored when the welding wire 6 is located on the side of the first base material 1. Even if the first and second base materials 1,2 are caused to warp upward or downward during welding such that the aimed point becomes offset from the preset point, the welding can be still continued while correcting the offset. A bead in the form of a fillet weld can, therefore, be caused to deposit efficiently with higher accuracy on the opposite side of the groove by simply performing arc welding from the side of the groove.

If the groove shifts or deforms in the direction of its distance to the tip of the welding wire 6, the welding wire is also controlled to move along a weld line.

In such a case, time is clocked from a return of the welding wire 6 to the contact position $P_1$ subsequent to its oscillation toward the groove of the first base material 1 by weaving until a return of the welding wire 6 to the contact position $P_1$ subsequent to its oscillation toward the second base material 2 (see FIG. 19 described above). During this time, actual voltages fed to the welding wire 6 are measured, and an actual average voltage during a single reciprocation of weaving from the contact point $P_1$ as the base point toward and from the second base material 2 is computed. Now assume that in FIG. 19, $V_O$ is a preset average voltage level. When the actual average voltage rises above a predetermined upper limit threshold $V_{OU}$, the distance between the welding wire 6 and the welded portion in the groove is taken to be greater than a predetermined, preset value and the welding wire 6 is moved toward the groove (in FIG. 17, in the horizontal direction toward the contact position $P_1$). When the above-described actual average voltage conversely falls below a lower limit threshold $V_{OL}$, the distance between the welding wire 6 and the groove is taken to be smaller than the predetermined, preset value and the welding wire 6 is moved away from the groove (from the side of the contact position $P_1$ in FIG. 17) in the horizontal direction.

When weaving is performed as described above, stable leg lengths as much as 7 to 5 mm in the vertical direction (the solid line which connects square dots) and 4 to 3 mm in the horizontal direction (the solid line which connects triangle dots) can be obtained in a wide range that the distance between the contact position $P_1$ and the aimed point $P_2$ ranges from 0.5 mm to 5 mm, as illustrated in FIG. 24. In other words, such weaving makes it possible to provide the offset of the aimed point with a greater tolerance.

In the foregoing, the description was made about the case in which variations in voltage were monitored. As an alternative, variations in current may be monitored. In such a case, increases or decreases take place in a form reversed to those in the case of voltage. As the welding current, a current of pulse waveform, a sunisoidal current or the like, which has high directivity, can be used instead of a direct current, although use of a high-directivity current such as a current of pulse waveform is preferred.

6. Sixth Embodiment

Figure 22:
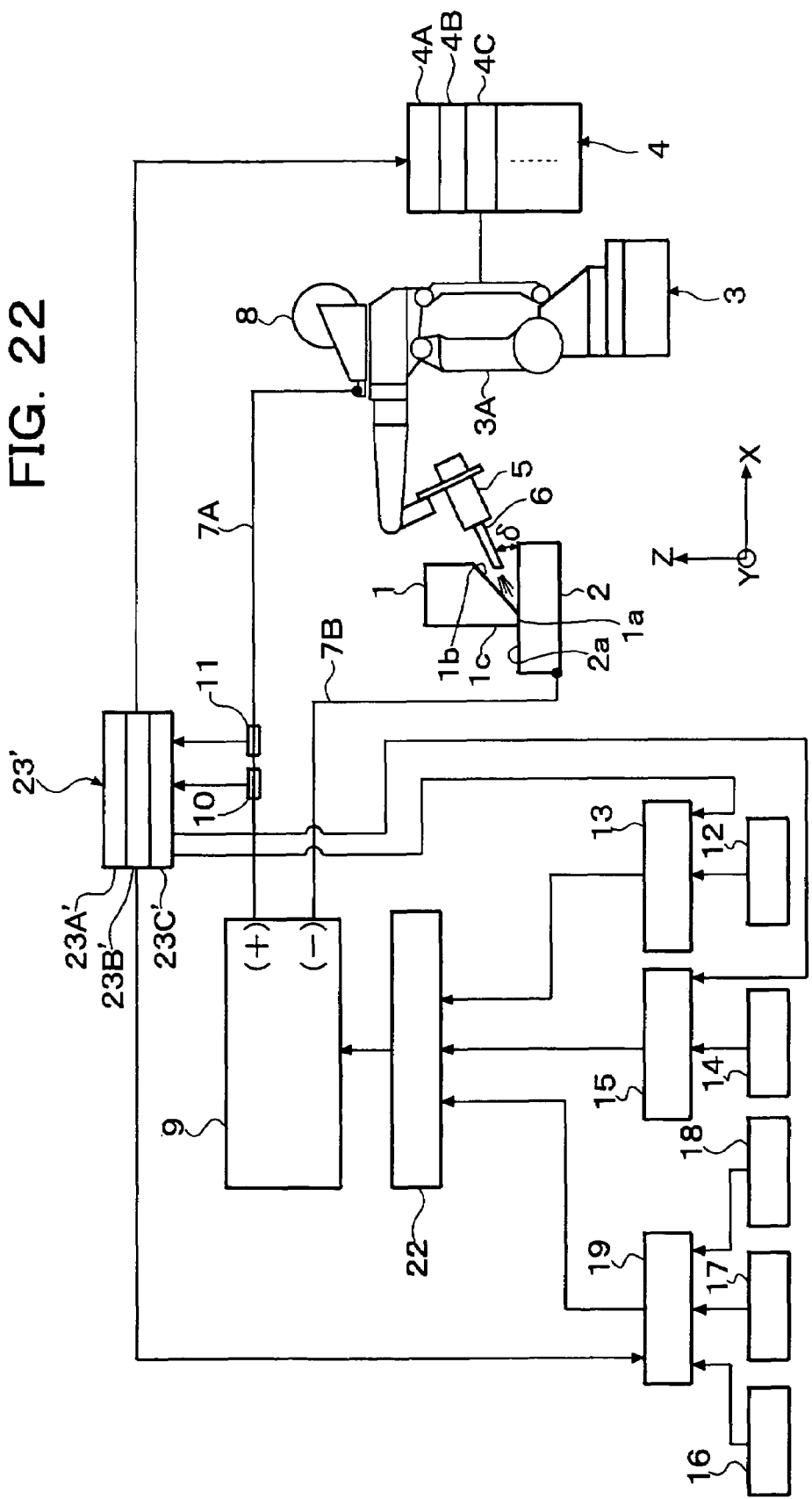
FIG. 22 is a diagram showing the construction of a welding apparatus according to a sixth embodiment of the present invention.

FIG. 22 is the diagram showing the construction of the welding apparatus according to the sixth embodiment of the present invention. In this embodiment, elements equivalent to the corresponding elements in the above-described fifth embodiment shown in FIG. 16 are designated by like reference signs, and overlapping descriptions are omitted.

The welding apparatus according to the sixth embodiment is constructed such that a pulse current is superimposed on a welding current. To the welding apparatus depicted in FIG. 16, a pulse waveform control device 19 is added in parallel with the voltage control device 13 and current control device 15 at a stage preceding an output control device 22'. At a stage preceding the pulse waveform control device 19, a peak voltage setting device 16 for setting a peak voltage for the pulse current, a base voltage setting device 17 for setting a base voltage for the pulse current and a pulse duration setting device 18 for setting a pulse duration for the pulse current are arranged in parallel with one another, and the real time of the pulse duration is inputted from a power diagnosis unit 23'. To the pulse waveform control device 19, the peak voltage, base voltage and pulse duration are inputted from the peak voltage setting device 16, base voltage setting device 17 and pulse duration setting device 18, respectively. Based on these inputs, a desired pulse waveform is produced as a basis.

Based on control signals inputted from the voltage control device 13, current control device 15 and pulse waveform control device 19, the output control device 22' controls welding electric power to be outputted from the welding power source 9. The power diagnosis unit 23' is composed of an input unit 23A', a comparison unit 23B', an output unit 23C, and the like. The input unit 23A' sets a first preset voltage higher than the average voltage set by the average voltage setting device 12, a second preset voltage lower than the average voltage set by the average voltage setting device 12, and a preset current higher than the average current set by the average current setting device 14. The comparison unit 23B' compares an actual voltage, which is inputted from the voltage detector 10, with the first and second present voltages and outputs a positional control signal, which will be described subsequently herein, to the robot controller 4, and also compares an actual current, which is inputted from the current detector 11, with the preset current and outputs a positional control signal to the robot controller 4. The comparison unit 23B' is also equipped with a function to determine, in addition to an actual average voltage and an actual average current, the actual peak current (or voltage) of the pulse current, the actual base current (or voltage) of the pulse current and the real time (width) of each pulse on the basis of detection values detected by the voltage detector 10 and current detector 11, respectively. From the output unit 23C', the actual average voltage and the actual average current are outputted to the voltage control device 13 and the current control device 15, respectively, while the actual peak current, the actual base current and the real time of the pulse duration are outputted to the pulse waveform control device 19. Like the fifth embodiment, the welding apparatus is equipped with a computer or the like, which controls all of the above-described individual control devices, robot and the like.

Welding which makes use of the welding apparatus constructed as described above is performed as will be described hereinafter.

Reference is had to FIG. 22. When from the peak voltage setting device 16, base voltage setting device 17 and pulse duration setting device 18, their respective preset values are inputted to the pulse waveform control device 19, a pulse waveform is produced at the pulse waveform control device 19. Its waveform control signal is outputted to the output control device 22'. Based on an average voltage control signal from the voltage control device 13, an average current control signal from the current control device 15 and the pulse waveform control signal from the pulse waveform control device 19, the output control device 22' controls the welding power source 9 such that electric power of the desired waveform is supplied from the welding power source 9. Depending on the characteristics of the power source 9 employed for the welding, the pulse waveform is set based on one or both of current and voltage.

Figure 23:
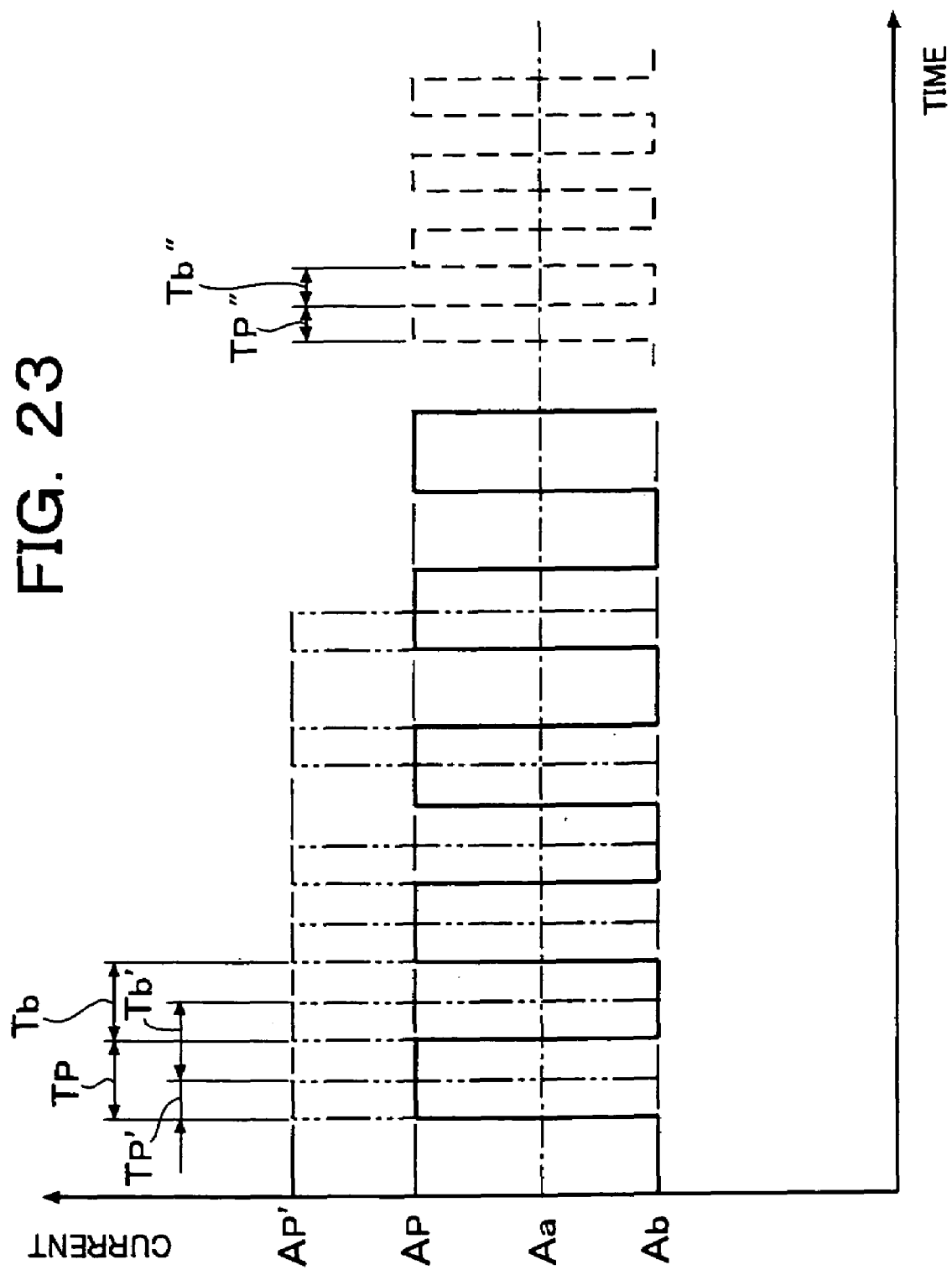
FIG. 23 is a waveform diagram of a pulse current in the welding apparatus shown in FIG. 22.

FIG. 23 is, as already referred to in brief, the waveform diagram of the pulse current for the welding apparatus according to the fifth embodiment shown in FIG. 22.

FIG. 23 shows a peak current $A_p$, a base current $A_b$, and a pulse width, namely, pulse duration $T_p$. $A_a$ indicates an average current. This average current $A_a$ is set by the above-described, average current setting device 14. Based on these preset values $A_p$, $A_b$, $T_p$ and $A_a$, the width, namely, time $T_b$ of the base current of pulses is determined by the above-described output control device 22', and a waveform in the form of a direct current with a pulse waveform superimposed thereon is supplied as an output control signal to the welding power source 9.

More specifically, with a waveform indicated by a solid line in FIG. 23, the peak current $A_p$, base current $A_b$ and pulse duration $T_p$ are given, for example, as 400 A, 200 A and 1/50 sec, respectively. Further, a value determined as the width, namely, duration $T_b$ of the base current on the basis of an average current $A_a$ of 300 A given from the average current setting device 14 (in this case, $T_b=T_p=1/50$ sec) is indicated.

When a pulse current obtained by super imposing a pulse-like current on a direct current is used as a welding current as described above, the directivity of an arc is enhanced compared with use of a current consisting of a direct current alone, thereby making it possible to produce the arc more accurately at a point aimed by the welding wire 6 and hence to perform more stable arc welding of a groove.

On the other hand, a waveform indicated by a double dashed line in FIG. 23 is a pulse waveform obtained, for example, when the peak current was raised further by 100 A to $A_{p'}$ (=500 A), the pulse duration was shortened to ½ of that in the case of the solid line, and the average current $A_a$ and base current $A_b$ were set at 300 A and 200 A, respectively, as in the case of the solid line.

In this case, the base current $A_b$ (=200 A) and average current $A_a$ (=300 A) were set at the same levels as in the case of the waveform indicated by the solid line. In the case of the waveform indicated by the solid line, the cycle of pulses is $(T_p+T_b)$. In the case of the waveform indicated by the double dashed line, on the other hand, the cycle is therefore shortened to $((T_p \times \frac{1}{2})+T_b)$. Expressing this in terms of duty, the duty in the case of the waveform indicated by the solid line is expressed by:

$$T_p/(T_p+T_b)=(1/50)/(1/50+1/50)=\frac{1}{2}$$

whereas the duty in the case of the waveform indicated by the double dashed line is expressed by:

$$T_{p'}/(T_{p'}+T_{b'})=(1/50\times 1/2)/((1/50\times 1/2)+1/50)=\frac{1}{3}$$

A waveform indicated by a dashed line in FIG. 23 is a pulse waveform obtained when relative to the waveform indicated by the solid line, the peak current $A_p$, base current $A_b$ and average current $A_a$ were left unchanged at 400 A, 200 A and 300 A, respectively, as in the case of the solid line and the pulse duration $T_{p''}$ was shortened to ½ of that in the case of the waveform indicated by the solid line. In this case, the base current width $T_{b''}$ becomes equal to $T_{p''}$, and the duty is ½ as in the case of the waveform indicated by the solid line.

In FIG. 23, some examples of pulse waveforms are shown as described above. An arc is provided with improved directivity when the duty of a pulse waveform is rendered smaller. However, the average current $A_a$, the peak current $A_p$ and base current $A_b$ of pulses, and the like in welding are correlated to various welding conditions and the like. From the standpoints of the transfer of globules by a welding arc, the stability of the arc, and the like, practical values of the average current $A_a$, base current $A_b$ and peak current $A_p$ in this embodiment can be around 300 A, not higher than 300 A (including a negative ampere), and 350 to 500 A or so, respectively.

As has been described above, the welding apparatus according to this embodiment, in addition to the control in the welding apparatus according to the fifth embodiment described above with reference to FIG. 16, uses a pulse current as a welding current and controls the pulse current such that the pulse current becomes equal to a preset value. This has made it possible to increase the directivity of an arc and to control the arc to the aimed point more accurately. As a consequence, stable welding can be performed on the groove without leaving any part undeposited by simply welding from the side of the groove while allowing a bead to deposit in the form of a fillet weld on the back side 1c of the groove.

Although not illustrated in any drawing, the peak voltage setting device 16, base voltage setting device 17, pulse duration setting device 18 and pulse waveform control device 19 in the welding apparatus according to this embodiment can be replaced by a sunisoidal current setting device. Because a sunisoidal current can be used as a welding current in this case, an arc can be provided with improved directivity similarly to the welding apparatus according to the sixth embodiment. As a result, similar welding can be performed as the welding apparatus according to the sixth embodiment.

As has been described above, the embodiments of the welding method according to the present invention and the embodiments of the welding apparatus according to the present invention have made it possible to perform the formation of an auxiliary bead without using any backing material or the like by one-side welding to the area of contact between the first base material 1 and the second base material 2 where a groove such as a single bevel groove or a single J groove is formed by a one-side groove wall, although such one-side welding has heretofore been infeasible unless a backing material or a bead, which does not contribute to the joining, is additionally applied. As a consequence, it is possible to significantly reduce the fabrication cost of a box-shaped, welded structure which has required a substantial time for welding work inside the structure.

In a structure inside which welding has heretofore been impossible due to a difficulty in inserting the welding torch 5, a leg length reaches both of the side of the groove and the back side of the groove, thereby bringing about significant advantageous effects in that the resulting joint can be provided with substantially improved strength and the strength of the joint can be retained without unnecessarily increasing the thicknesses of two base materials to be brought into abutment.

In connection with a butt-welded joint, the present invention requires welding work only from one side even if the butt-welded joint is of such a welded structure that has heretofore required to also perform welding on the back side of the groove. The present invention, therefore, makes it possible to efficiently decrease the number of welding steps. Owing to these advantageous effects, it is also possible to achieve diversification and to improve efficiency as to the designing of a welded structure.

INDUSTRIAL APPLICABILITY

As has been described above, the welding method according to the present invention makes it possible to achieve welding in a groove and also to stably deposit a bead in the form of a fillet weld on the back side of the groove owing to a difference in thermal capacity between a first base material provided with the groove face and a second base material having a flat surface and fusion of a welding wire. Described specifically, a bead in the form of a fillet weld can also be formed by causing a greater portion of an arc to generate on the side of the second material the thermal capacity of which is greater; causing the first base material, the thermal capacity of which is smaller, to fuse to such an extent that an end portion of the first base material, said end portion being located on the side of a single groove face, is not punched through; and forcing out a melt of the welding wire to the back side of the groove while filling up the groove owing to melting of the welding wire. As a result, no work is needed for the arrangement of an auxiliary bead so that the workability can be improved significantly.

In addition, according to welded joints and welded structures of the present invention, the fabrication cost is low and further, the fabrication time can be shortened. It is, therefore, possible to improve the productivity of products in which such welded joints and/or welded structures are incorporated.

According to the welding apparatus of the present invention, the position of the welding wire can be controlled with high accuracy. It is, therefore, possible to provide welded joints, structures of closed cross-sections and the like, each of which has been fabricated such that one or more beads in the form of fillet weld or welds are deposited inside by arranging a single groove face at at least one location on an outer side of a base material and then performing welding to the groove from the outside. Accordingly, their productivity can be improved substantially.

Moreover, the tolerance of an offset from an aimed point can be enlarged by weaving the welding wire. As a result, welding can be performed with high accuracy and high efficiency, thereby significantly improving the welding workability.

What is claimed is:

1. A welding apparatus for butt welding a first base material and a second base material with each other, comprising:
    a welding wire to be introduced into a groove formed at an area of contact between said first base material and said second material,
    a control device for controlling a position of said welding wire,
    a welding power source for feeding welding electric power to said area of contact, and
    control means for outputting a command to said control device such that said welding wire is moved toward said second base material when an actual voltage fed from said welding power source to said area of contact has exceeded a first preset voltage level set in advance and said welding wire is moved toward said first base material when an actual current fed from said welding power source to said area of contact has exceeded a preset current level set in advance or said actual voltage has fallen below a second preset voltage level set in advance.

2. A welding apparatus for butt welding a first base material and a second base material with each other, comprising:
    a welding wire to be introduced into a groove formed at an area of contact between said first base material and said second material,
    a control device for controlling a position of said welding wire,
    a welding power source for feeding welding electric power to said area of contact, and
    control means for outputting a command to said control device such that said welding wire is moved toward said second base material when an actual voltage fed from said welding power source to said area of contact has exceeded a first preset voltage level set in advance and said welding wire is moved toward said first base material when an actual current fed from said welding power source to said area of contact has exceeded a preset current level set in advance or said actual voltage has fallen below a second preset voltage level set in advance and also for comparing said actual current and voltage with a preset average current level and preset average voltage level set in advance, respectively, and outputting a current control signal and voltage control signal to said welding power source such that these actual
    current and voltage are brought into conformity with said preset current and voltage levels set in advance.

3. A welding apparatus for butt welding a first base material and a second base material with each other, comprising:
    a welding wire,
    a welding torch for holding said welding wire in place, feeding means for feeding said welding wire to said welding torch,
    a control unit provided with a position control device for positionally controlling said welding wire in directions of three orthogonal axes,
    a welding power source for feeding welding electric power to an area of contact between said first base material and said second base material,
    an average voltage setting device for setting an average voltage level for said welding,
    an average current setting device for setting an average current level for said welding,
    a voltage detector and current detector for detecting an actual welding voltage and actual welding current to form, by said welding wire positioned facing on a groove formed by a single groove face arranged on said first base material and a flat surface of said second base material, a bead in a form of a fillet weld on a back side of said groove,
    a power diagnosis unit for being inputted with said actual voltage detected by said voltage detector and said actual current detected by said current detector and outputting a command to said position control device such that said welding wire is moved toward said second base material when said actual voltage has exceeded a first preset voltage level set in advance and said welding wire is moved toward said first base material when said actual current detected by said current detector has exceeded a preset current level set in advance or said actual voltage detected by said voltage detector has fallen below a second preset voltage level set in advance and also for outputting said actual voltage and outputting said actual current,
    said current control device for comparing said average current level inputted from said average current setting device with said actual current inputted from said power diagnosis unit and outputting a current control signal such that this actual current is brought into correspondence with said preset current level set in advance,
    a voltage control device for comparing said average voltage level inputted from said average voltage setting device with said actual voltage inputted from said power diagnosis unit and outputting a voltage control signal such that this actual voltage is brought into conformity with said preset voltage level set in advance, and said output control device for being inputted with said current control signal outputted from said current control device and said voltage control signal outputted from said voltage control device, and based on said current control signal and voltage control signal, outputting a power source control signal to said welding power source to control an output of said power source.

4. A welding apparatus according to claim 3, wherein said welding apparatus is provided with:

a peak voltage setting device for setting a peak voltage for a pulse voltage, a base voltage setting device for setting a base voltage, a pulse duration setting device for setting a pulse duration, and a pulse waveform control device for being inputted with said preset peak voltage, preset base voltage level and preset pulse duration from said peak voltage setting device, base voltage setting device and pulse duration setting device, respectively, comparing these preset values with an actual peak voltage, actual base voltage and actual pulse duration, respectively, and outputting a waveform control signal to said output control device, said power diagnosis unit comprises means for determining an actual peak voltage, actual base voltage and actual pulse duration on a basis of said actual voltage detected by said voltage detector and said actual current detected by said current detector, and outputting the thus-determined actual peak voltage, actual base voltage and actual pulse duration to said pulse waveform control device, and said output control device comprises means for being inputted with said waveform control signal outputted from said pulse waveform control device and outputting a power source control signal, which controls an output of said power source, to said welding power source on a basis of said voltage control signal inputted from said voltage control device and said current control signal inputted from said current control device.

5. A welding apparatus according to claim 3, wherein:

said pulse waveform control device comprises sinusoidal current forming means for converting a welding current into a sinusoidal current, comparing a preset sinusoidal waveform, which has been set in advance, with an actual sinusoidal waveform and outputting a waveform control signal to said output control device, said power diagnosis unit comprises means for determining an actual current waveform on a basis of said actual voltage detected by said voltage detector and said actual current detected by said current detector, and outputting the thus-determined actual current waveform to said sinusoidal current forming means, and said output control device comprises means for outputting a power source control signal, which controls an output of said power source, to said welding power source on a basis of said waveform control signal inputted from said sinusoidal current forming means, said voltage control signal inputted from said voltage control device and said current control signal inputted from said current control device.

6. A welding apparatus for butt welding a first base material and a second base material with each other, comprising:

a welding wire to be introduced through a welding torch into a groove formed by bringing said first base material, on which a root face and a single groove face have been formed, into contact with said second material having a flat surface, a control device for controlling a position of said welding wire, a welding power source for feeding welding electric power to said area of contact, a voltage detector for detecting an actual voltage to be fed from said welding power source to said area of contact, a clock device for detecting a time, at which an arc from said welding wire passes through a position of contact between an end portion of said single groove face and said flat surface, and clocking a time after said arc passes through said position of contact until said arc moves toward said first base material and returns back to said predetermined position, memory means for storing a change in welding voltage during said clocking time by said voltage detector and said clock device, and wire position control means for continuing preceding weaving control when a time (t4–t3)—t3 being a time at which an actual voltage begins to exceed a preset voltage level set in advance and t4 being a time at which said actual voltage falls below said preset voltage level, both while clocking a second predetermined time Ate subsequent to an elapse of a first predetermined time At, from a time point at which said welding wire passed through said position of contact during said clocking time—falls within a target time range in which adequate fusion takes place without punching through said first base material, moving a center axis of weaving of said welding wire toward said second base material when said time (t4–t3) exceeds said target time, and moving said center axis of weaving toward said first base material when said time (t4–t3) falls below said target time.

7. A welding apparatus for butt welding a first base material and a second base material with each other, comprising:

a welding wire to be introduced through a welding torch into a groove formed by bringing said first base material, on which a root face and a single groove face have been formed, into contact with said second material having a flat surface, a control device for controlling a position of said welding wire, a welding power source for feeding welding electric power to said area of contact, a current detector for detecting an actual current to be fed from said welding power source to said area of contact, a clock device for detecting a time, at which an arc from said welding wire passes through a position of contact between an end portion of said single groove face and said flat surface, and clocking a time after said arc passes through said position of contact until said arc moves toward said first base material and returns back to said predetermined position, memory means for storing a change in welding current during said clocking time by said current detector and said clock device, and wire position control means for continuing preceding weaving control when a time (t4—t3)-t3 being a time at which an actual current begins to fall below a preset current level set in advance and t4 being a time at which said actual current exceeds said preset voltage level, both while clocking a second predetermined time Ate subsequent to an elapse of a first predetermined time At, from a time point at which said welding wire passed through said position of contact during said clocking time—falls within a target time range in which adequate fusion takes place without punching through said first base material, moving a center axis of weaving of said welding wire toward said second base material when said time (t4–t3) exceeds said target time, and moving said center axis of weaving toward said first base material when said time (t4–t3) falls below said target time.

8. A welding apparatus for butt welding a first base material and a second base material with each other, comprising:
   a welding wire to be introduced through a welding torch into a groove formed by bringing said first base material, on which a root face and a single groove face have been formed, into contact with said second material having a flat surface, a control device for controlling a position of said welding wire,
   a welding power source for feeding welding electric power to said area of contact,
   a voltage detector for detecting an actual voltage to be fed from said welding power source to said area of contact,
   a clock device for detecting a time, at which an arc from said welding wire passes through a position of contact between an end portion of said single groove face and said flat surface, and clocking a time after said arc passes through said position of contact until said arc moves toward said first base material and returns back to said predetermined position,
   memory means for storing a change in welding voltage during said clocking time by said voltage detector and said clock device, and
   wire tip position control means for moving a tip of said welding wire away from said position of contact when an actual average voltage during said clocking time falls below a preset first voltage level, moving said tip of said welding wire toward said position of contact when said actual average voltage exceeds a preset second voltage level, and maintaining said tip of said welding wire at a preceding position when said actual average voltage falls between said preset first voltage level and said preset second voltage level.

9. A welding apparatus for butt welding a first base material and a second base material with each other, comprising:
   a welding wire to be introduced through a welding torch into a groove formed by bringing said first base material, on which a root face and a single groove face have been formed, into contact with said second material having a flat surface, a control device for controlling a position of said welding wire,
   a welding power source for feeding welding electric power to said area of contact,
   a current detector for detecting an actual current to be fed from said welding power source to said area of contact,
   a clock device for detecting a time, at which an arc from said welding wire passes through a position of contact between an end portion of said single groove face and said flat surface, and clocking a time after said arc passes through said position of contact until said arc moves toward said first base material and returns back to said predetermined position,
   memory means for storing a change in welding current during said clocking time by said current detector and said clock device, and
   wire tip position control means for moving a tip of said welding wire away from said position of contact when an actual average current during said clocking time exceeds a preset first current level, moving said tip of said welding wire toward said position of contact when said actual average current falls below a preset second current level, and maintaining said tip of said welding wire at a preceding position when said actual average current falls between said preset first current level and said preset second current level.

10. A welding method for butt welding a first base material and a second base material with each other, said first base material having an abutting end portion with a groove face and a root face formed on a side thereof and on a free end thereof, respectively, and said second base material having a flat surface at which said first base material is to be brought into contact with said second base material, which comprises:
   bringing said root face of said first base material into contact with said flat surface of said second base material,
   arranging a welding wire to face at a predetermined inclination relative to said flat surface of said second base material such that a center axis of an arc from said welding wire is to be directed toward a position of contact between an end portion of said groove face of said first base material and said flat surface of said second base material or a position adjacent and not farther than said position of contact, and then, in a course of performing arc welding,
   inputting less heat in said first base material than in said second base material such that said abutting end portion of said first base material is caused to fuse to a back side thereof without a burn-through while causing said flat surface of said second base material to fuse, thereby to form a molten pool with melts of said first base material, second base material and welding wire,
   forcing out said molten pool to said back side of said abutting end portion of said first base material such that said molten pool is formed extending integrally from an inside of said groove to said back side of said abutting end portion of said first base material, and
   allowing said molten pool to resolidify such that a bead is formed in a form of a fillet weld on said back side of said abutting end portion of said first base material.

11. A welding method according to claim 10, wherein said welding wire is caused to weave with a predetermined oscillation width within said groove while maintaining said predetermined inclination.

12. A welding method according to claim 10, wherein said welding wire is caused to weave with a predetermined oscillation width with a center of weaving set at a predetermined point on said predetermined inclination within said groove.

13. A welding method according to claim 11 or 12, wherein:
   while said welding wire is weaving, a change in welding voltage or welding current during a time after said arc moves past said position of contact until said arc moves toward said first base material and returns back to said position of contact is detected based on a time at which said arc passes through said position of contact, and said welding wire is moved in a direction of a width of said groove on a basis of the thus-detected change such that said center of said weaving always remains at an appropriate position relative to said groove.

14. A welding method according to claim 11 or 12, wherein:
while said welding wire is weaving, a change in welding voltage or welding current during a time after said arc moves past said position of contact until said arc moves toward said first base material and returns back to said position of contact is detected based on a time at which said arc passes through said position of contact, and
a tip of said welding wire is moved toward or away from said position of contact on a basis of the thus-detected change such that said center of weaving always remains at an appropriate position relative to said groove.

15. A welding method according to claim 10 wherein a current for generating said arc is a direct current.

16. A welding method according to claim 10 wherein a current for generating said arc is a current obtained by superimposing a direct current and a pulse current on each other.

17. A welding method according to claim 10 wherein a current for generating said arc is a sinusoidal current.

18. A welded "T" joint with a first base material and a second base material butt welded with each other, said first base material having an abutting end portion with a groove face and a root face formed on a side thereof and on a free end thereof, respectively, and said second base material having a flat surface at which said first base material is to be brought into contact with said second base material, wherein said welded "T" joint has been fabricated by:
bringing said root face of said first base material into contact with said flat surface of said second base material,
arranging a welding wire to face at a predetermined inclination relative to said flat surface of said second base material such that a center axis of an arc from said welding wire is to be directed toward a position of contact between an end portion of said groove face of said first base material and said flat surface of said second base material or a position adjacent and not farther than said position of contact, and then, in a course of performing arc welding,
inputting less heat in said first base material than in said second base material such that said abutting end portion of said first base material is caused to fuse to a back side thereof without a burn-through while causing said flat surface of said second base material to fuse, thereby to form a molten pool with melts of said first base material, second base material and welding wire,
forcing out said molten pool to said back side of said abutting end portion of said first base material such that said molten pool is formed extending integrally from an inside of said groove to said back side of said abutting end portion of said first base material, and
allowing said molten pool to resolidify such that a bead is formed in a form of a fillet weld on said back side of said abutting end portion of said first base material.

19. A butt-welded "T" joint of flat plates with a first base material and a second base material butt welded with each other, said first base material having an abutting end portion with a groove face and a root face formed on a side thereof and on a free end thereof, respectively, and said second base material having a flat surface at which said first base material is to be brought into contact with said second base material, wherein said butt-welded "T" joint has been fabricated by:
bringing said root face of said first base material into contact with said flat surface of said second base material,
arranging a welding wire to face at a predetermined inclination relative to said flat surface of said second base material such that a center axis of an arc from said welding wire is to be directed toward a position of contact between an end portion of said groove face of said first base material and said flat surface of said second base material or a position adjacent and not farther than said position of contact, and then, in a course of performing arc welding,
inputting less heat in said first base material than in said second base material such that said abutting end portion of said first base material is caused to fuse to a back side thereof without a burn-through while causing said flat surface of said second base material to fuse, thereby to form a molten pool with melts of said first base material, second base material and welding wire,
forcing out said molten pool to said back side of said abutting end portion of said first base material such that said molten pool is formed extending integrally from an inside of said groove to said back side of said abutting end portion of said first base material, and
allowing said molten pool to resolidify such that a bead is formed in a form of a fillet weld on said back side of said abutting end portion of said first base material.

20. A box-shaped structure formed of a plurality of plates comprising a first plate and a second plate butt-welded with each other, said first plate having an abutting end portion with a groove face and a root face formed on a side thereof and on a free end thereof, respectively, and said second plate having a flat surface at which said first plate is to be brought into contact with said second plate, wherein said box-shaped structure has been fabricated by:
bringing said root face of said first plate into contact with said flat surface of said second plate,
arranging a welding wire to face at a predetermined inclination relative to said flat surface of said second plate such that a center axis of an arc from said welding wire is to be directed toward a position of contact between an end portion of said groove face of said first plate and said flat surface of said second plate or a position adjacent and not farther than said position of contact, and then, in a course of performing arc welding,
inputting less heat in said first plate than in said second plate such that said abutting end portion of said first plate is caused to fuse to a back side thereof without a burn-through while causing said flat surface of said second plate to fuse, thereby to form a molten pool with melts of said first plate, second plate and welding wire,
forcing out said molten pool to said back side of said abutting end portion of said first plate such that said molten pool is formed extending integrally from an inside of said groove to said back side of said abutting end portion of said first plate, and
allowing said molten pool to resolidify such that a bead is formed in a form of a fillet weld on said back side of said abutting end portion of said first plate.

* * * * *